United States Patent
Akiyama

(10) Patent No.: US 6,934,894 B2
(45) Date of Patent: Aug. 23, 2005

(54) CONTROL APPARATUS FOR CONTROLLING RECOVERY OF TERMINAL-STATION APPARATUS FROM ABNORMALITY

(75) Inventor: Masaki Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 716 days.

(21) Appl. No.: 10/060,594

(22) Filed: Jan. 30, 2002

(65) Prior Publication Data

US 2003/0061553 A1 Mar. 27, 2003

(30) Foreign Application Priority Data

Sep. 21, 2001 (JP) ........................... 2001-288027

(51) Int. Cl.$^7$ ............................ H02H 3/05; G01R 31/28; H04M 1/24

(52) U.S. Cl. ................... 714/712; 714/43; 379/1.01

(58) Field of Search .................. 714/712, 56, 3, 714/4, 43, 47; 379/1.01, 22.14, 9, 14.01; 375/219, 220, 224, 228; 709/100, 102, 104, 239; 455/500, 507, 509, 67.1, 78, 560, 115

(56) References Cited

U.S. PATENT DOCUMENTS

| | | | | |
|---|---|---|---|---|
| 5,193,086 A | * | 3/1993 | Satomi et al. | ............... 370/228 |
| 6,154,859 A | * | 11/2000 | Norizuki et al. | ............... 714/47 |
| 6,201,788 B1 | * | 3/2001 | Ishiwatari | ................... 370/228 |
| 6,490,457 B1 | * | 12/2002 | Lee | ............................ 455/458 |
| 6,519,320 B2 | * | 2/2003 | Yanagi | ..................... 379/22.04 |

* cited by examiner

*Primary Examiner*—Christine T. Tu
(74) *Attorney, Agent, or Firm*—Katten Muchin Zavis Rosenman

(57) ABSTRACT

A control apparatus for controlling a recovery of a terminal-station apparatus includes a communication-state-monitoring unit for detecting an abnormality appearing at each second going-up transmission channel unit.

8 Claims, 19 Drawing Sheets

CONTROL APPARATUS FOR CONTROLLING RECOVERY OF TERMINAL-STATION APPARATUS FROM ABNORMALITY

BACKGROUND OF THE INVENTION

1. Field of the Invention

The present invention relates to a recovery of a terminal-station apparatus connecting a terminal apparatus to an exchange from an abnormality.

2. Description of the Related Art

A terminal such as a PC is connected to a terminal apparatus. A plurality of terminal apparatuses is connected to a terminal-station apparatus through a coupler. The terminal-station apparatus is connected to a plurality of exchanges. Communications between a terminal apparatus and the terminal-station apparatus in the going-up and going-down directions are carried out through a channel allocated by the terminal-station apparatus to the terminal apparatus. An apparatus number is assigned to each of the terminal apparatuses. Channels are allocated to the terminal apparatuses in ascending order of apparatus numbers. One channel or a plurality of channels are allocated to a terminal apparatus in dependence on the width of a band required by the terminal apparatus. If necessary, the width of the band can also be increased dynamically. When receiving data through a channel allocated to a terminal apparatus, the terminal-station apparatus maps the channel onto a channel of the exchange serving as the destination of the data and transmits the data to the exchange through the channel allocated to the exchange. When receiving data from an exchange through a channel allocated to the exchange, on the other hand, the terminal-station apparatus maps the channel onto a channel allocated to the terminal station serving as the destination of the data and transmits the data to the terminal station through the channel allocated to the terminal station.

FIG. 18 is a diagram showing the configuration of the conventional transmission network. As shown in FIG. 18, the transmission network includes a plurality of terminal apparatuses 2#ij where i=1 to m and j=1 to n, a coupler 4#i, a terminal-station apparatus 6 and a plurality of exchanges 8#k where k=1 to p. A terminal apparatus 2#ij is connected to the terminal-station apparatus 6 by typically an optical fiber. By the same token, the terminal-station apparatus 6 is connected to an exchange 8#k by typically an optical fiber. The terminal-station apparatus 6 includes a plurality of subscriber-line termination units 10#i where i=1 to m, a cross-connect unit 12 and a plurality of exchange connection units 14#k where k=1 to p.

FIG. 19 is a diagram showing details of components for going-up and going-down channels in the terminal-station apparatus 6. As shown in the figure, for the going-up channels, a subscriber-line termination unit 10#i includes a plurality of going-up reception channel units 20#iq where q=1, 2 and so on, a switch 22#i and a plurality of going-up transmission channel units 24#iq where q=1, 2 and so on. For the going-down channels, on the other hand, the subscriber-line termination unit 10#i includes a plurality of going-down reception channel units 44#iq where q=1, 2 and so on, a the switch 42#i and a plurality of going-down transmission channel units 40#iq where q=1, 2 and so on. By the same token, for the going-up channels, the cross-connection unit 12 includes a plurality of going-up reception channel units 30#iq where i=1 to m and q=1, 2 and so on, a switch 32 and a plurality of going-up transmission channel units 34#iq where i=1 to m and q=1, 2 and so on. For the going-down channels, on the other hand, the cross-connection unit 12 includes a plurality of going-down reception channel units 54#iq where i=1 to m and q=1, 2 and so on, a switch 52 and a plurality of going-down transmission channel units 50#iq where i=1 to m and q=1, 2 and so on. The going-up transmission channel units 24#iq are connected to the going-up reception channel units 30#iq respectively. In the same way, the going-down reception channel units 44#iq are connected to the going-down transmission channel units 50#iq respectively.

A signal of a going-up channel is explained by referring to FIGS. 18 and 19. A signal of a going-up channel is supplied from a terminal apparatus 2#ij and output to an exchange 8#p. In a subscriber-line termination unit 10#i for accommodating terminal apparatuses 2#ij, the going-up reception channel units 20# are assigned to the terminal apparatuses 2#ij in ascending order of apparatus numbers assigned to the terminal apparatuses 2#ij. To put it in detail, a going-up channel is newly assigned to a terminal apparatus 2#ij having an apparatus number higher than the apparatus number of a terminal apparatus 2#ij already having a going-up channel assigned thereto, and cataloged going-up reception channel numbers are updated. In addition, the going-up reception channel is also assigned to the corresponding going-up transmission channel unit 24#cd. In the subscriber-line termination unit 10#i, going-up channels are assigned to going-up transmission channel units 24#ef connected to going-up reception channel units 20#ab in an order the channels are cataloged. In this case, no already assigned transmission channel numbers are updated. Consider a case in which the terminal apparatuses 2#10 and 2#12 having apparatus numbers of 0 and 2 respectively have already been connected. When the terminal apparatus 2#11 is newly connected, no already assigned transmission channel numbers are updated in order to avoid effects on terminal apparatuses already in communication. The going-up transmission channel unit 24#ef is connected to the going-up reception channel unit 30#ef employed in the cross-connect unit 12. Thus, in the cross-connect unit 12, the going-up reception channel unit 30#ef needs to be connected to the going-up transmission channel unit 34#ab.

A communication abnormality may occur in the terminal-station apparatus between a terminal apparatus and an exchange. Communication abnormalities caused by the terminal-station apparatus are listed as follows:

a: A subscriber-line termination unit is not capable of receiving data correctly due to a problem of the reception channel unit employed in the subscriber-line termination unit.

b: Data cannot be propagated correctly due to an abnormality occurring in the switch connecting the reception channel unit and the transmission channel unit in a subscriber-line termination unit.

c: The cross-connect unit is not capable of receiving data correctly due to a problem of the transmission channel unit employed in a subscriber-line termination unit.

d: The cross-connect unit is not capable of receiving data correctly due to a problem of the reception channel unit employed in the cross-connect unit.

e: The cross-connect unit is not capable of receiving data correctly due to a problem of the switch connecting the reception channel unit to the transmission channel unit in the cross-connect unit.

f: An exchange connection unit is not capable of receiving data correctly due to a problem of the transmission channel unit employed in the cross-connect unit.

g: An exchange connection unit is not capable of receiving data correctly due to a problem of a reception channel unit employed in the exchange connection unit.

h: An exchange is not capable of receiving data correctly due to a problem of the transmission channel unit employed in the exchange connection unit.

The failures described above can be handled by adoption of the following conventional methods:

1: Each unit employed in the terminal-station apparatus is designed into a redundant configuration. As described above, units employed in the terminal-station apparatus are the subscriber-line termination unit, the cross-connect unit and the exchange connection unit. With such a redundant configuration, when a working system in the configuration fails, a spare system in the configuration is used as a substitute for the working system. This method is referred to as related art 1.

2: The connection of a terminal apparatus and an exchange is changed by reconnecting the terminal to another exchange. This method is referred to as related art 2.

However, the above conventional methods have the following problems. In related art 1, if the cost does not permit a redundant configuration, there is raised a problem that a failure causes an immediate communication service suspension. With related art 2, on the other hand, a route connecting a terminal apparatus and an exchange is changed. Thus, setting on the exchange side needs to be changed too.

SUMMARY OF THE INVENTION

It is therefore an object of the present invention to provide a terminal apparatus capable of solving problems (b) to (e) described above without requiring a redundant configuration and without changing setting on the exchange side.

In accordance with an aspect of the present invention, there is provided a control apparatus for controlling a recovery of a terminal-station apparatus including a subscriber-line termination unit, which has a plurality of first going-up reception channel units accommodating a plurality of terminal apparatuses and a plurality of first going-up transmission channel units and is used for connecting each of the first going-up reception channel units to a corresponding one of the first going-up transmission channel units, a cross-connect unit, which has a plurality of second going-up reception channel units and a plurality of second going-up transmission channel units and is used for connecting each of the second going-up reception channel units to a corresponding one of the second going-up transmission channel units and an exchange connection unit being connected each of the second going-up transmission channel units and an exchange.

The control apparatus includes a communication-state-monitoring unit for detecting an abnormality appearing at each of the second going-up transmission channel units, a first channel-identifying unit for identifying one of the second going-up reception channel units that is connected to the second going-up transmission channel unit determined by the communication-state-monitoring unit as a channel unit indicating an abnormality, a second channel-identifying unit for identifying one of the first going-up reception channel units that is connected to the second going-up reception channel unit identified by the first channel-identifying unit through one of the first going-up transmission channel units, a first control unit, which is used for controlling the cross-connect unit so as to connect a particular one of the second going-up transmission channel units to an available one of the second going-up reception channel units in case the particular one of the second going-up transmission channel units is determined by the communication-state-monitoring unit as a channel unit indicating an abnormality and a second control unit for controlling the subscriber-line termination unit so as to connect the first going-up reception channel unit identified by the second channel-identifying unit to an available one of the first going-up transmission channel units.

In accordance with another aspect of the present invention, there is provided a control apparatus for controlling a recovery of a terminal-station apparatus including a subscriber-line termination unit, which has a plurality of first going-down transmission channel units accommodating a plurality of terminal apparatuses and a plurality of first going-down reception channel units and is used for connecting each of the first going-down reception channel units to a corresponding one of the first going-down transmission channel units, a cross-connect unit, which has a plurality of second going-down reception channel units and a plurality of second going-down transmission channel units and is used for connecting each of the second going-down reception channel units to a corresponding one of the second going-down transmission channel units and an exchange connection unit for connecting each of the second going-down transmission channel units to an exchange.

The control apparatus includes a communication-state-monitoring unit for detecting an abnormality appearing at each of the first going-down transmission channel units, a first channel-identifying unit for identifying one of the first going-down reception channel units that is connected to the first going-down transmission channel unit determined by the communication-state-monitoring unit as a channel unit indicating an abnormality, a second channel-identifying unit for identifying one of the second going-down reception channel units that is connected to the first going-down reception channel unit identified by the first channel-identifying unit through one of the second going-down transmission channel units, a first control unit, which is used for controlling the subscriber-line termination unit so as to connect a particular one of the first going-down transmission channel units to an available one of the first going-down reception channel units in case the particular one of the first going-down transmission channel units is determined by the communication-state-monitoring unit as a channel unit indicating an abnormality and a second control unit for controlling the cross-connect unit so as to connect the second going-down reception channel unit identified by the second channel-identifying unit to an available one of the second going-down transmission channel units.

The above and other objects, features and advantages of the present invention as well as the manner of realizing them will become more apparent, and the invention itself will be best understood from a study of the following description and appended claims with reference to attached drawings showing some preferred embodiments of the invention.

DETAILED DESCRIPTION OF THE PREFERRED EMBODIMENTS

Figure 1:
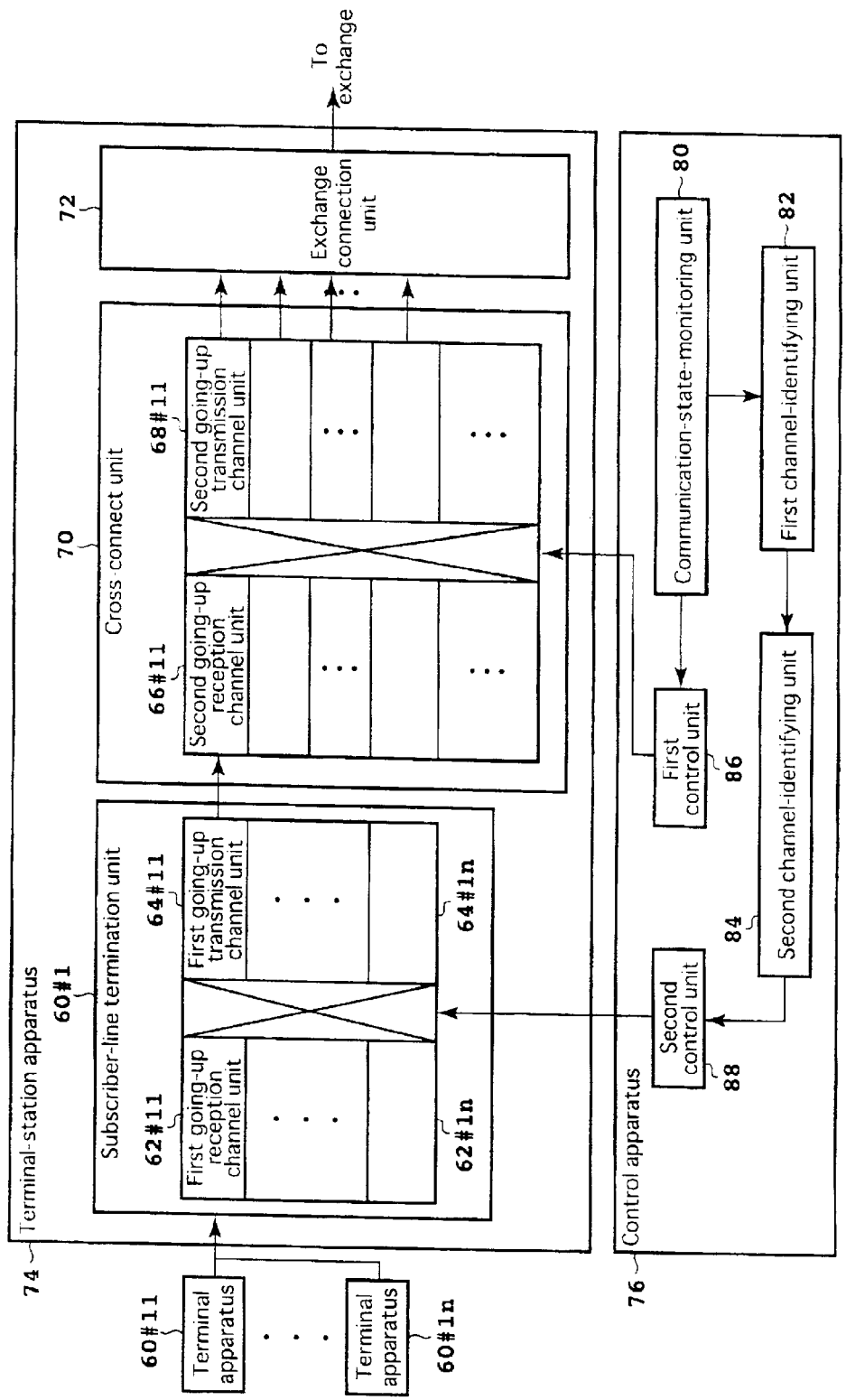
FIG. 1 is a block diagram showing the principle of the present invention.

Prior to an explanation of some preferred embodiments of the present invention, the principle of the invention is described. FIG. 1 is a block diagram showing the principle of the present invention. As shown in FIG. 1, a terminal-station apparatus 74 includes subscriber-line termination units 60#i where i=1, 2 and so on, a cross-connect unit 70 and an exchange connection unit 72. A subscriber-line termination unit 60#i includes a plurality of first going-up reception channel units 62#ij where i=1, 2 and so on whereas j=1, 2 and so on and a plurality of first going-up transmission channel units 64#ij where i=1, 2 so on whereas j=1, 2 and so on. The subscriber-line termination unit 60#i connects a first going-up reception channel unit 62#ij to a corresponding first going-up transmission channel units 64#pq. On the other hand, the cross-connect unit 70 includes a plurality of second going-up reception channel units 66#ij where i=1, 2 and so on whereas j=1, 2 and so on and a plurality of second going-up transmission channel units 68#ij where i=1, 2 and so on whereas j=1, 2 and so on. The cross-connect unit 70 connects a second going-up reception channel unit 66#ij to a corresponding second going-up transmission channel unit 68#rs.

A control apparatus 76 controls a recovery of the terminal-station apparatus 74 from an abnormality. The control apparatus 76 includes a communication-state-monitoring unit 80, a first channel-identifying unit 82, a second channel-identifying unit 84, a first control unit 86 and a second control unit 88. The communication-state-monitoring unit 80 detects an abnormality appearing at each of the second going-up transmission channel units 68#ij where i=1, 2 and so on whereas j=1, 2 and so on. Assume that the communication-state-monitoring unit 80 detects an abnormality indicated by the second going-up transmission channel unit 68#11. When an abnormality indicated by the second going-up transmission channel unit 68#11 is detected by the communication-state-monitoring unit 80, the first channel-identifying unit 82 identifies one of the second going-up reception channel units 66#ab, for example the second going-up reception channel unit 66#13, that is connected to the second going-up transmission channel unit 68#11 determined by the communication-state-monitoring unit 80 as a channel unit indicating an abnormality. The second channel-identifying unit 84 identifies one of the first going-up reception channel units 62#cd, for example the first going-up reception channel unit 62#12, that is connected to the second going-up reception channel unit 66#13 identified by the first channel-identifying unit 82.

The first control unit 86 is used for controlling the cross-connect unit 70 so as to connect the second going-up transmission channel unit 68#11 to an available second going-up reception channel units 66#ef, for example the second going-up reception channel unit 66#15, when the second going-up transmission channel unit 68#11 is determined by the communication-state-monitoring unit 80 as a channel unit indicating an abnormality. The second control unit 88 is used for controlling the subscriber-line termination unit 60#1 so as to connect the first going-up reception channel unit 62#12 identified by the second channel-identifying unit 84 to an available first going-up transmission channel unit 64#15, for example.

In this way, as a substitute for the abnormal transmission route, the terminal-station apparatus 74 sets a new route from the first going-up reception channel unit 62#12 to the second going-up transmission channel unit 68#11 by way of the newly selected available first going-up transmission channel unit 64#15 and the newly selected available second going-up reception channel unit 66#15. Thus, when the second going-up transmission channel unit 68#11 is determined by the communication-state-monitoring unit 80 as a channel unit indicating an abnormality, the abnormal transmission route can be recovered by replacing the route from the first going-up reception channel unit 62#12 to the second going-up transmission channel unit 68#11 by way of the first going-up transmission channel unit 64#13 and the second going-up reception channel unit 66#13 with the newly set route from the first going-up reception channel unit 62#12 to the second going-up transmission channel unit 68#11 by way of the newly selected available first going-up transmission channel unit 64#15 and the newly selected available second going-up reception channel unit 66#15.

Figure 2:
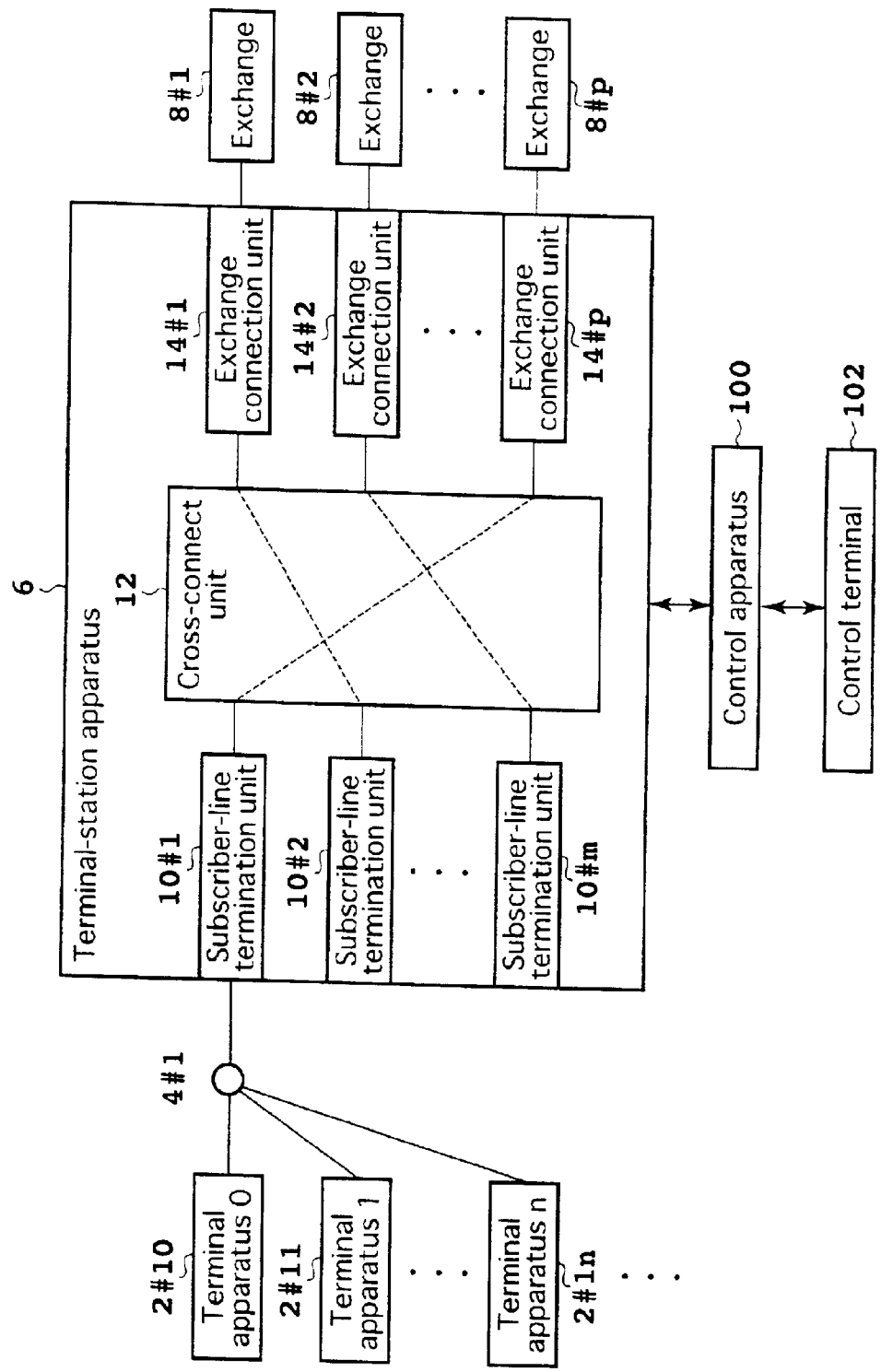
FIG. 2 is a block diagram showing a transmission network implemented by an embodiment of the present invention.
Figure 18:
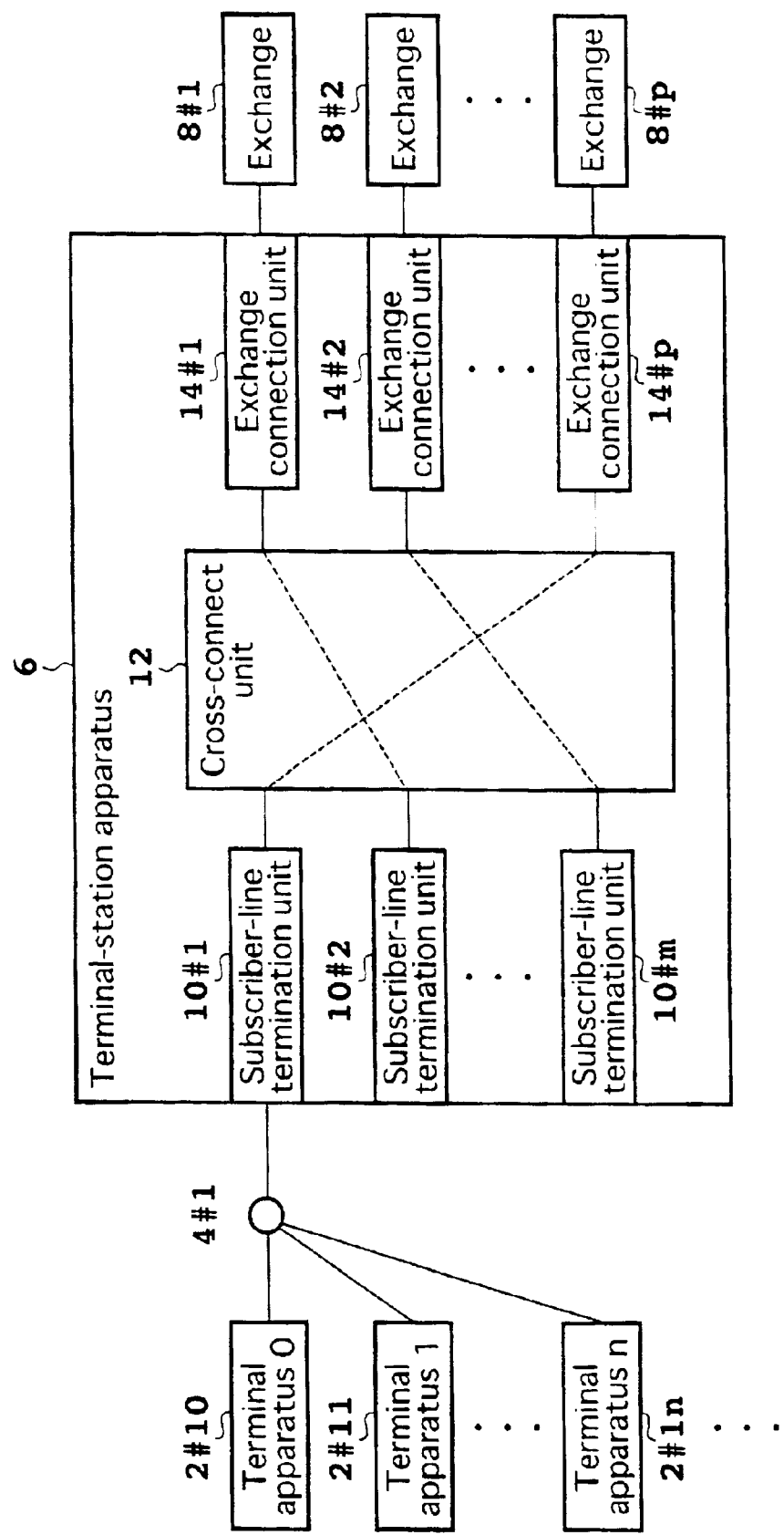
FIG. 18 is a block diagram showing the conventional transmission network.
Figure 19:
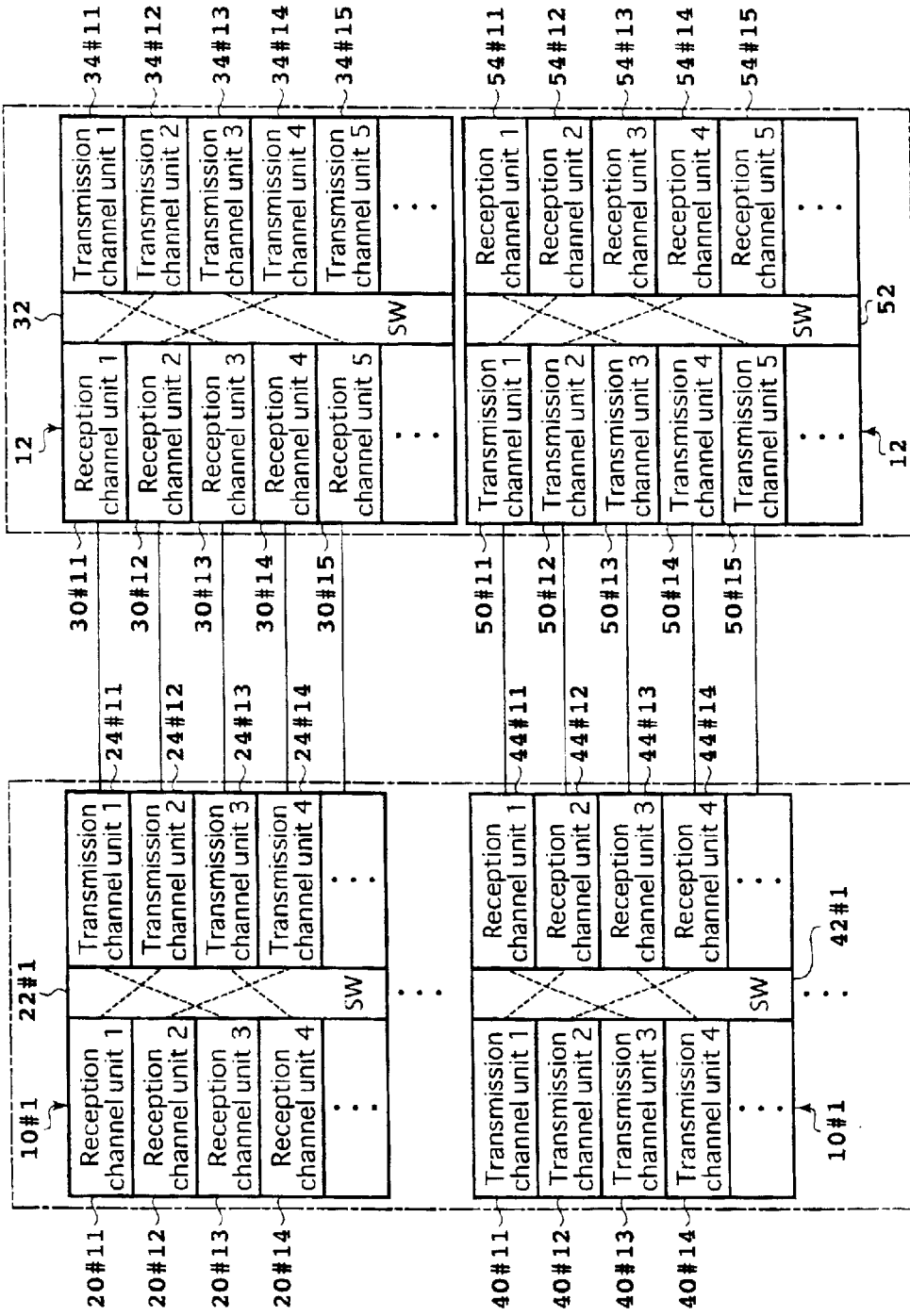
FIG. 19 is a block diagram showing the configurations of a subscriber-line termination unit and a cross-connect unit, which are employed in a terminal-station apparatus of the conventional transmission network shown in FIG. 18.

FIG. 2 is a block diagram showing a transmission network implemented by an embodiment of the present invention. Configuration elements of the embodiment that are identical with those employed in the conventional transmission network shown in FIG. 18 are denoted by the same reference numerals. A control apparatus 100 has the following functions:

1: In the terminal-station apparatus 6, set a connection between the first going-up reception channel unit and the first going-up transmission channel unit in the subscriber-line termination unit 10#i and a connection between the second going-up reception channel unit and the second going-up transmission channel unit in the cross-connect unit 12 for the going-up channel of the terminal apparatus 2#ij.

2: Form a judgment as to whether the going-up channels ending with the going-up transmission channel units 34#ij employed in the cross-connect unit 12 where i=1, 2 and so on whereas j=1, 2 and so on are normal or abnormal. In the formation of the judgment on the normal or abnormal state, typically, an all-zero signal through a going-up channel is determined to indicate that the channel is abnormal.

3: Perform the following processing in case the outcome of the judgment indicates that a going-up channel of a going-up transmission channel unit 34#ij employed in the cross-connect unit 12 is abnormal.

3-i: Request the cross-connect unit 12 to identify a going-up reception channel unit 30#ab connected to the going-up transmission channel unit 34#ij.

3-ii: Identify a going-up reception channel unit 20#ac connected to the going-up reception channel unit 30#ab through a going-up transmission channel unit 24#ab.

3-iii: Request the cross-connect unit 12 to connect an available going-up reception channel unit 30#ad to the going-up transmission channel unit 34#ij.

3-iv: Request the subscriber-line termination unit 10#a to connect the going-up reception channel unit 20#ac to an available going-up transmission channel unit 24#ad connected to the available going-up reception channel unit 30#ad.

4: Form a judgment as to whether the going-down channels ending with the going-down transmission channel units 40#ij employed in the subscriber-line termination unit 10#i where i=1, 2 and so on whereas j=1, 2 and so on are normal or abnormal.

5: Perform the following processing in case the outcome of the judgment indicates that a going-down channel of a going-down transmission channel unit 40#ij employed in the subscriber-line termination unit 10#i is abnormal.

5-i: Request the subscriber-line termination unit 10#i to identify a going-down reception channel unit 44#ia connected to the going-down transmission channel unit 40#ij.

5-ii: Identify a going-down reception channel unit 54#bc connected to the going-down reception channel unit 44#ia through a going-down transmission channel unit 50#ia.

5-iii: Request the subscriber-line termination unit 10#i to connect an available going-down reception channel unit 44#id to the going-down transmission channel unit 40#ij.

3-iv: Request the cross-connect unit 12 to connect the going-down reception channel unit 54#bc to an available going-down transmission channel unit 50#id connected to the available going-down reception channel unit 44#id.

A control terminal 102 is a terminal for outputting a connection between an exchange 8#j and a terminal apparatus 2#i to which a channel is to be assigned to the control apparatus 100. The connection is entered to the control terminal 102 by a person in charge of maintenance. The control apparatus 100 can be embedded in the terminal-station apparatus 6. In the case of this embodiment, the control apparatus 100 is connected to the terminal 6 by a communication line such as a LAN or a dedicated line.

Figure 3:
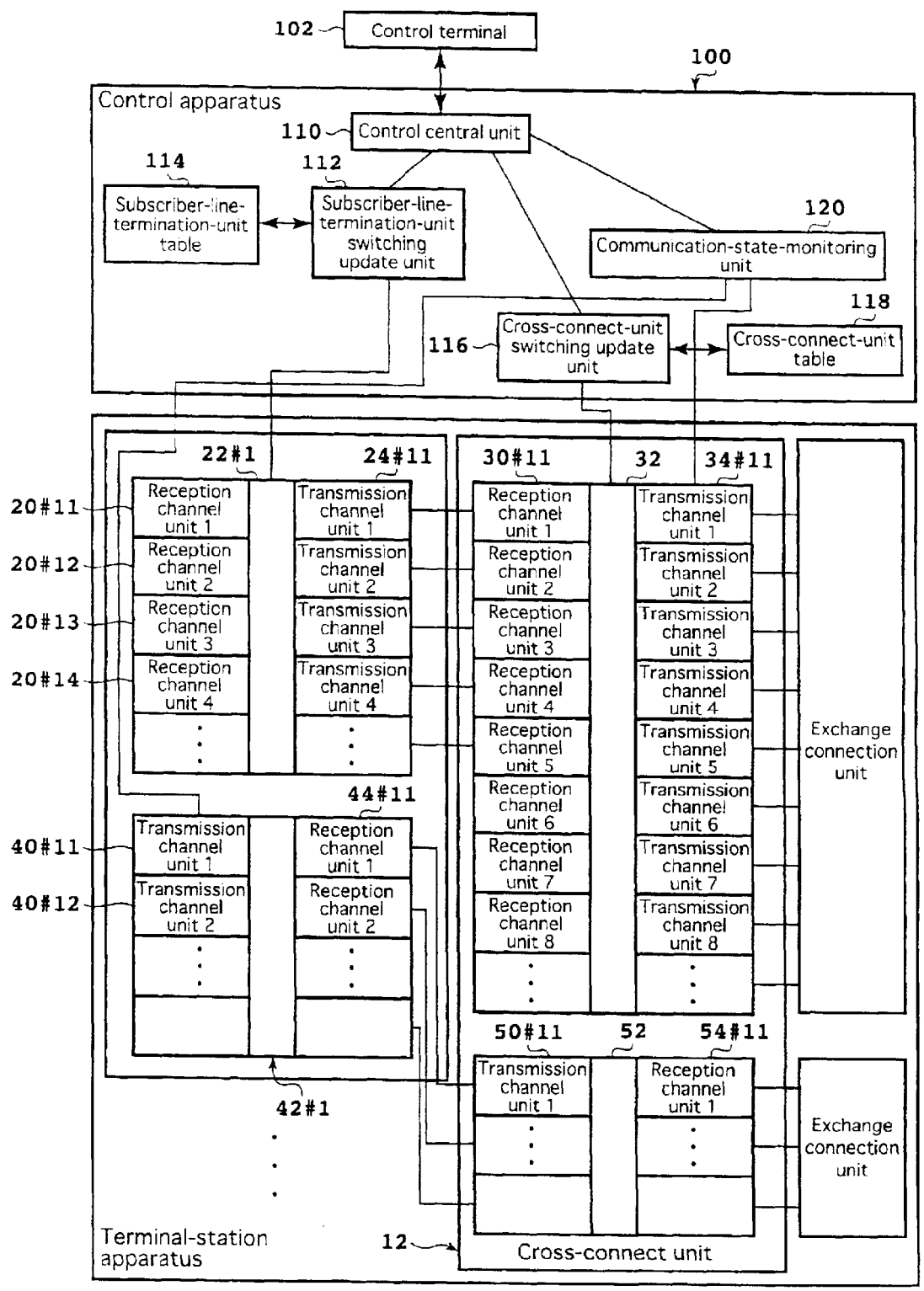
FIG. 3 is a block diagram showing the configuration of a control apparatus employed in the transmission network shown in FIG. 2.

FIG. 3 is a block diagram showing the configuration of a typical control apparatus 100 employed in the transmission network shown in FIG. 2. As shown in FIG. 3, the control apparatus 100 includes a control central unit 110, a subscriber-line-termination-unit switching update unit 112, a subscriber-line-termination-unit table 114, a cross-connect-unit switching update unit 116, a cross-connect-table unit 118 and a communication-state-monitoring unit 120. The control central unit 110 has the following functions:

1: Request the subscriber-line-termination-unit switching update unit 112 and the cross-connect-unit switching update unit 116 to assign going-up and going-down channels to a terminal apparatus 2#ij when the operator provides from the control terminal 102 with a connection between an exchange 8#k and the terminal apparatus 2#ij. Pass on a request received from the control terminal 102 to release channels assigned to the terminal apparatus 2#ij to the subscriber-line-termination-unit switching update unit 112 and the cross-connect-unit switching update unit 116.

2: Carry out the following pieces of processing when receiving a notice of an abnormality occurring in a channel involving a going-up transmission channel unit 34#ij in the cross-connect unit 12 from the communication-state-monitoring unit 120.

2-i: Identify a going-up reception channel unit 30#ab connected to the going-up transmission channel unit 34#ij by referring to the cross-connect-unit table 118 through the cross-connect-unit switching update unit 116.

2-ii: Inform the cross-connect-unit switching update unit 116 that a channel involving the going-up transmission channel unit 34#ij is abnormal and, at the same time, inform the subscriber-line-termination-unit switching update unit 112 that a channel involving a going-up transmission channel unit 24#ab connected to the going-up reception channel unit 30#ab is abnormal. The cross-connect-unit switching update unit 116 and the subscriber-line-termination-unit switching update unit 112 are informed of the abnormality at the same time so that the subscriber-line termination unit 10#a and the cross-connect unit 12 also carry out switching operations at the same time as well.

3: Carry out the following pieces of processing when receiving a notice of an abnormality occurring in a channel involving a going-down transmission channel unit 40#ij in the subscriber-line termination unit 10#i from the communication-state-monitoring unit 120.

3-i: Identify a going-down reception channel unit 44#ab connected to the going-down transmission channel unit 40#ij by referring to the subscriber-line-termination-unit table 114 through the subscriber-line-termination-unit switching update unit 112.

3-ii: Inform the subscriber-line-termination-unit switching update unit 112 that a channel involving the going-down transmission channel unit 40#ij is abnormal and, at the same time, inform the cross-connect-unit switching update unit 116 that a channel involving a going-down transmission channel unit 50#ab connected to the going-down reception channel unit 44#ab is abnormal.

The subscriber-line-termination-unit switching update unit 112 has the following functions:

1: Carry out the following pieces of processing when requested by the control central unit 110 to assign channels to the terminal apparatuses 2#ij.

1-i: Assign a going-up reception channel unit 20#ia and a going-down transmission channel unit 40#ib to each of the terminal apparatuses 2#ij in ascending order of apparatus numbers.

1-ii: Assign an available going-up transmission channel unit 24#ic to be connected to a going-up reception channel unit 20#ia and an available going-down reception channel unit 44#id to be connected to a going-down transmission channel unit 40#ib to terminal apparatuses 2#ij in an order the available channel units are cataloged.

1-iii: Catalog the connection of the available going-up transmission channel unit 24#ic and the going-up reception channel unit 20#ia, the connection of the available going-down reception channel unit 44#id and the going-down transmission channel unit 40#ib, and information on available channels in the subscriber-line-termination-unit table 114.

2: Carry out the following pieces of processing when receiving a notice of an abnormality occurring in a channel involving a going-up transmission channel unit 24#ij in the subscriber-line termination unit 10#i from the control central unit 110.

2-i: Identify a going-up reception channel unit 20#ia connected to the going-up transmission channel unit 24#ij by referring to the subscriber-line-termination-unit table 114.

2-ii: Identify an available going-up transmission channel unit 24#ib with a lowest channel number by referring to the subscriber-line-termination-unit table 114.

2-iii: Catalog the connection of the going-up reception channel unit 20#ia and the available going-up transmission channel unit 24#ib in the subscriber-line-termination-unit table 114.

2-iv: Request the subscriber-line termination unit 10#i to connect the going-up reception channel unit 20#ia to the available going-up transmission channel unit 24#ib.

3: Carry out the following pieces of processing when receiving a notice of an abnormality occurring in a channel involving a going-down transmission channel unit 40#ij in the subscriber-line termination unit 10#i from the control central unit 110.

3-i: Identify an available going-down reception channel unit 44#ia with a lowest channel number by referring to the subscriber-line-termination-unit table 114.

3-ii: Catalog the connection of the going-down transmission channel unit 40#ij and the available going-down reception channel unit 44#ia in the subscriber-line-termination-unit table 114.

3-iii: Request the subscriber-line termination unit 10#i to connect the going-down transmission channel unit 40#ij and the available going-down reception channel unit 44#ia.

The subscriber-line-termination-unit table 114 is a table used for cataloging information on going-up and going-down channels for the subscriber-line termination units 10#i where i=1 to m. The information on going-up channels includes a connection between going-up reception channel units, going-up transmission channel units and the apparatus numbers of the terminal apparatuses 2#ij to which the going-up reception channel units and the going-up transmission channel units are assigned. The information on going-up channels also includes information on available going-up transmission channel units. On the other hand, the information on going-down channels includes a connection between going-down reception channel units, going-down transmission channel units and the apparatus numbers of the terminal apparatuses 2#ij to which the going-down reception channel units and the going-down transmission channel units are assigned. The information on going-down channels also includes information on available going-down reception channel units.

The cross-connect-unit switching update unit 116 has the following functions:

1: Carry out the following pieces of processing when requested by the control central unit 110 to assign a channel assigned to the terminal apparatus 2#ij to the exchange connection unit 14#k.

1-i: Assign a going-up transmission channel unit 34#ab and a going-down reception channel unit 54#cd to the exchange connection unit 14#k.

1-ii: Assign a going-up reception channel unit 30#ie connected to the going-up transmission channel unit 34#ab and a going-down transmission channel unit 50#if connected to the going-down reception channel unit 54#cd to the exchange connection unit 14#k. The going-up reception channel unit 30#ie and the going-down transmission channel unit 50#if are selected from the going-up reception channel units 30#ik where k=1, 2 and so on and the going-down transmission channel units 50#ik where k=1, 2 and so on respectively in an order the available channel units are cataloged. It should be noted that, since channels are assigned in the cross-connect unit 12 and the subscriber-line termination unit 10i in an order the available channel units are cataloged, the going-up reception channel unit 30#ie and the going-down transmission channel unit 50#if are connected to respectively a going-up transmission channel unit and a going-down reception channel unit assigned in the subscriber-line termination unit 10#i.

1-iii: Catalog the connection of the going-up reception channel unit 30#ie and the going-up transmission channel unit 34#ab, a connection between the going-down transmission channel unit 50#if and the going-down reception channel unit 54#cd as well as information on available channels in the cross-connect-unit table 118.

2: Carry out the following pieces of processing when receiving a notice of an abnormality occurring in a channel involving a going-up transmission channel unit 34#ij in the cross-connect unit 12 from the control central unit 110.

2-i: Identify an available going-up reception channel unit 30#ac by referring to the cross-connect-unit table 118. The available going-up reception channel unit 30#ac is a going-up reception channel unit with a smallest reception channel number among available going-up reception channel units 30#ak to be connected to the going-up transmission channel unit 34#ij and the subscriber-line termination unit 10#a where k=1, 2 and so on.

2-ii: Catalog the connection of the available going-up reception channel unit 30#ac and the going-up transmission channel unit 34#ij in the cross-connect-unit table 118.

2-iii: Request the cross-connect unit 12 to connect the available going-up reception channel unit 30#ac to the going-up transmission channel unit 34#ij.

3: Carry out the following pieces of processing when receiving a notice of an abnormality occurring in a channel involving a going-down transmission channel unit 50#ij in the cross-connect unit 12 from the control central unit 110.

3-i: Find a going-down reception channel unit 54#ab connected to the going-down transmission channel unit 50#ij by referring to the cross-connect-unit table 118.

3-ii: Find an available going-down transmission channel unit 50#ic having a smallest channel number among the going-down transmission channel units 50#ik where k=1, 2 and so on by referring to the cross-connect-unit table 118.

3-iii: Catalog the connection of the available going-down transmission channel unit 50#ic and the going-down reception channel units 54#ab in the cross-connect-unit table 118.

3-iv: Request the cross-connect unit 12 to connect the available going-down transmission channel unit 50#ic to the going-down reception channel units 54#ab.

The cross-connect-unit table 118 is a table used for cataloging information on going-up and going down channels for the exchange connection units 14#i where i=1 to p. The information on going-up channels includes a connection between going-up reception channel units and going-up transmission channel units. The information on going-up channels also includes information on available going-up reception channel units. On the other hand, the information on going-down channels includes a connection between going-down reception channel units and going-down transmission channel units. The information on going-down channels also includes information on available going-down transmission channel units.

The communication-state-monitoring unit 120 checks a signal output by each of the going-up transmission channel units 34#ij where i=1, 2 and so on whereas j=1, 2 and so on in the cross-connect unit 12 in order to determine whether a going-up channel including the going-up transmission channel unit 34#ij is normal or abnormal. By the same token, the communication-state-monitoring unit 120 also checks a signal output by each of the going-down transmission channel units 40#ij where i=1, 2 and so on whereas j=1, 2 and so on in the subscriber-line termination unit 10#i where i=1, 2 and so on in order to determine whether a going-down channel including the going-down transmission channel unit 40#ij is normal or abnormal. If an abnormality is detected, the communication-state-monitoring unit 120 informs the control apparatus 100 of the abnormality.

The operation of the transmission network shown in FIG. 2 is explained as follows.

1: Processing of a recovery from an abnormality of a going-up channel

Figure 4:
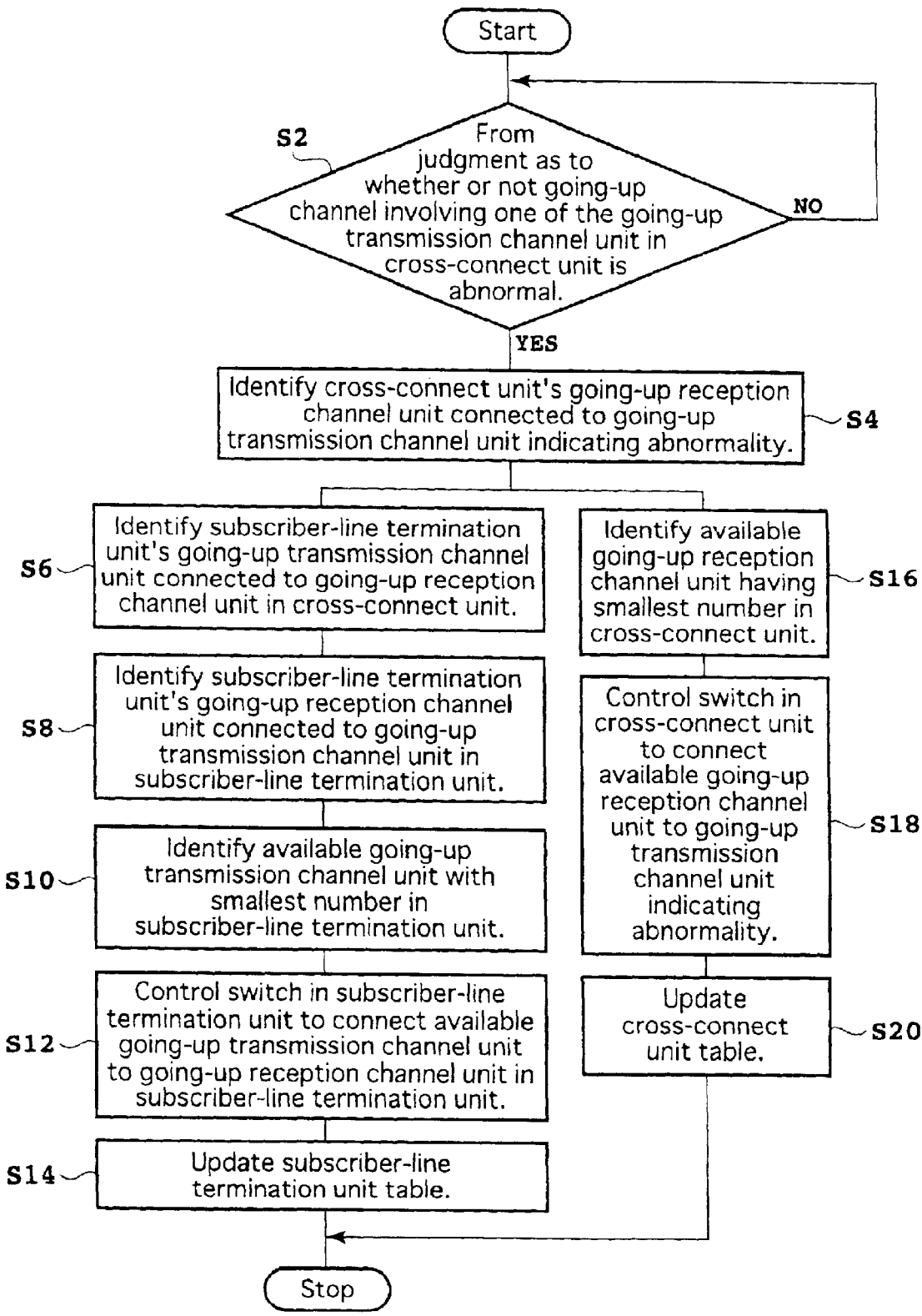
FIG. 4 is a flowchart representing a recovery method adopted in the event of an abnormality occurring in a going-up channel.

FIG. 4 is a flowchart representing a recovery method adopted in the event of an abnormality occurring in a going-up channel. As shown in FIG. 4, the flowchart begins with a step S2 to form a judgment as to whether or not the control central unit 110 has been informed by the communication-state-monitoring unit 120 that a going-up channel involving one of the going-up transmission channel units 34#ij where i=1, 2 and so on whereas j=1, 2 and so on in the cross-connect unit 12 is abnormal. If the control central unit 110 has been informed of an abnormality by the communication-state-monitoring unit 120, the flow of the processing goes on to a step S4. If the control central unit 110 has not been informed of an abnormality by the communication-state-monitoring unit 120, on the other hand, the flow of the processing goes back to the step S2 to form the same judgment in a state of waiting for the communication-state-monitoring unit 120 to inform the control central unit 110 of an abnormality. Assume that a going-up channel involving the going-up transmission channel unit 34#ab in the cross-connect unit 12 is abnormal. In this case, at the next step S4, the control central unit 110 identifies a going-up reception channel unit 30#cd connected to the going-up transmission channel unit 34#ab by referring to the cross-connect-unit table 118. Then, the control central unit 110 informs the subscriber-line-termination-unit switching update unit 112 that a channel involving the going-up reception channel unit 30#cd is abnormal. In addition, the control central unit 110 also informs the cross-connect-unit switching update unit 116 that a channel involving the going-up transmission channel unit 34#ab is abnormal.

At a next step S6, the subscriber-line-termination-unit switching update unit 112 identifies a going-up transmission channel unit 24#cd connected to the going-up reception channel unit 30#cd. At the next step S8, the subscriber-line-termination-unit switching update unit 112 identifies a going-up reception channel unit 20#ce connected to the going-up transmission channel unit 24#cd by referring to the subscriber-line-termination-unit table 114. At the next step S10, the subscriber-line-termination-unit switching update unit 112 identifies an available going-up transmission channel unit 24#cf with a smallest number by referring to the subscriber-line-termination-unit table 114. At the next step S12, the subscriber-line-termination-unit switching update unit 112 controls the switch 22#c to connect the available going-up transmission channel unit 24#cf to the going-up reception channel unit 20#ce. At the next step S14, the subscriber-line-termination-unit switching update unit 112 catalogs the connection of the going-up transmission channel unit 24#cf and the going-up reception channel unit 20#ce in the subscriber-line-termination-unit table 114. The subscriber-line-termination-unit switching update unit 112 also catalogs the going-up transmission channel unit 24#cd in the subscriber-line-termination-unit table 114 as an available going-up transmission channel unit.

At the next step S16, the cross-connect-unit switching update unit 116 identifies an available going-up reception channel unit 30#cf having a smallest number among the going-up reception channel units 30#ck where k=1, 2 and so on by referring to the cross-connect-unit table 118. At the next step S18, much like the execution of the step S12, the cross-connect-unit switching update unit 116 controls the switch 32 to connect the available going-up reception channel unit 30#cf to the going-up transmission channel unit 34#ab. At the next step S20, the cross-connect-unit switching update unit 116 catalogs the connection of the available going-up reception channel unit 30#cf and the going-up transmission channel unit 34#ab in the cross-connect-unit table 118. The subscriber-line-termination-unit switching update unit 112 also catalogs the going-up reception channel unit 30#cd in the cross-connect-unit table 118 as an available going-up reception channel unit.

Figure 5:
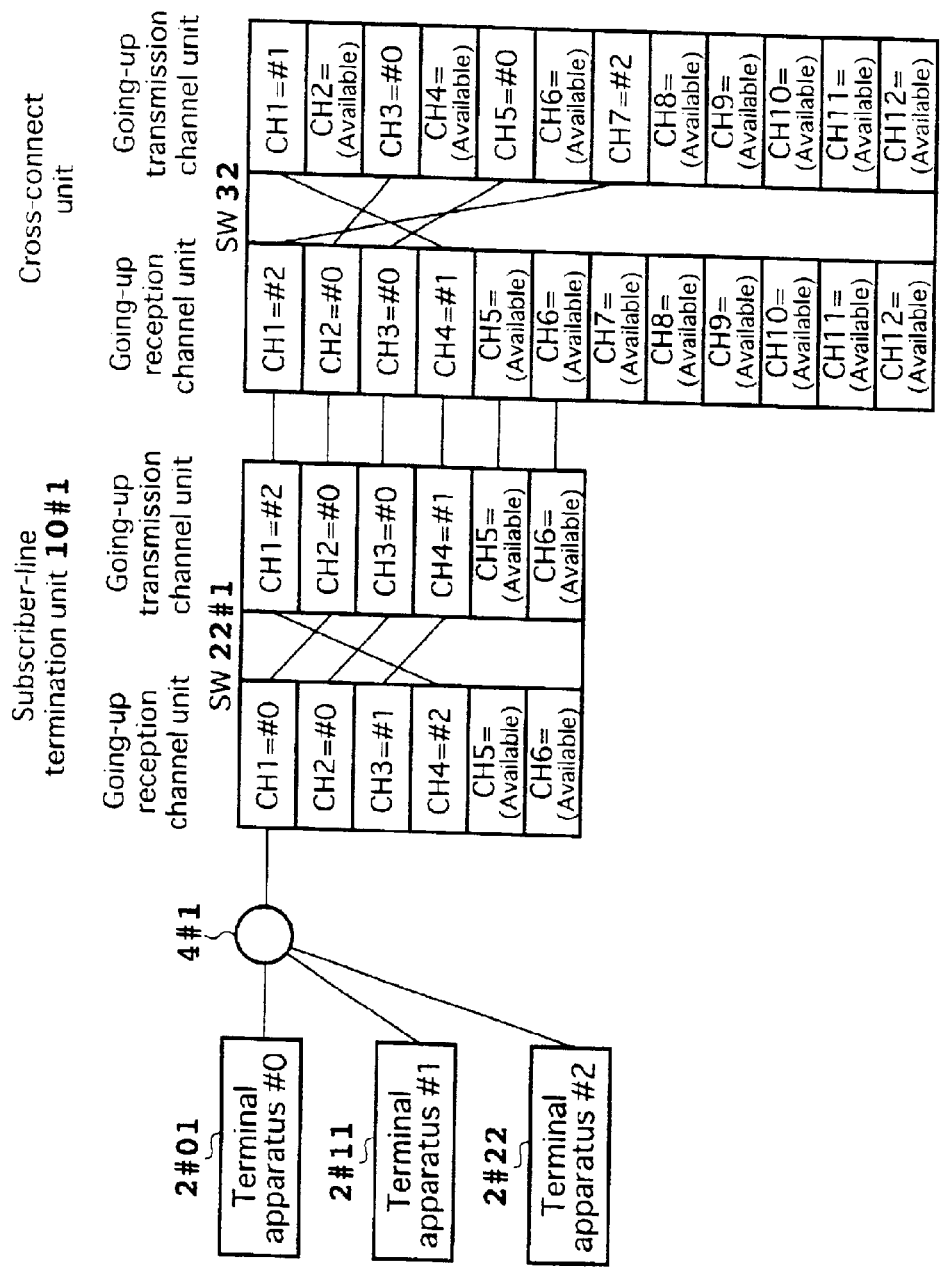
FIG. 5 is a diagram showing a normal state of a going-up channel.

A recovery from an abnormality is exemplified in concrete terms as follows. FIG. 5 is a diagram showing a normal state of a going-up channel. To be more specific, the diagram shows typical connections between the subscriber-line termination unit 10#1 and the cross-connect unit 12. In FIG. 5, notation CHX=#Y indicates that a channel with a channel number X is assigned to a terminal apparatus 2#1Y having an apparatus number Y. Solid lines in the switch 22#1 and the switch 32 each indicate that a going-up reception channel unit is connected to a going-up transmission channel unit.

Figure 6:
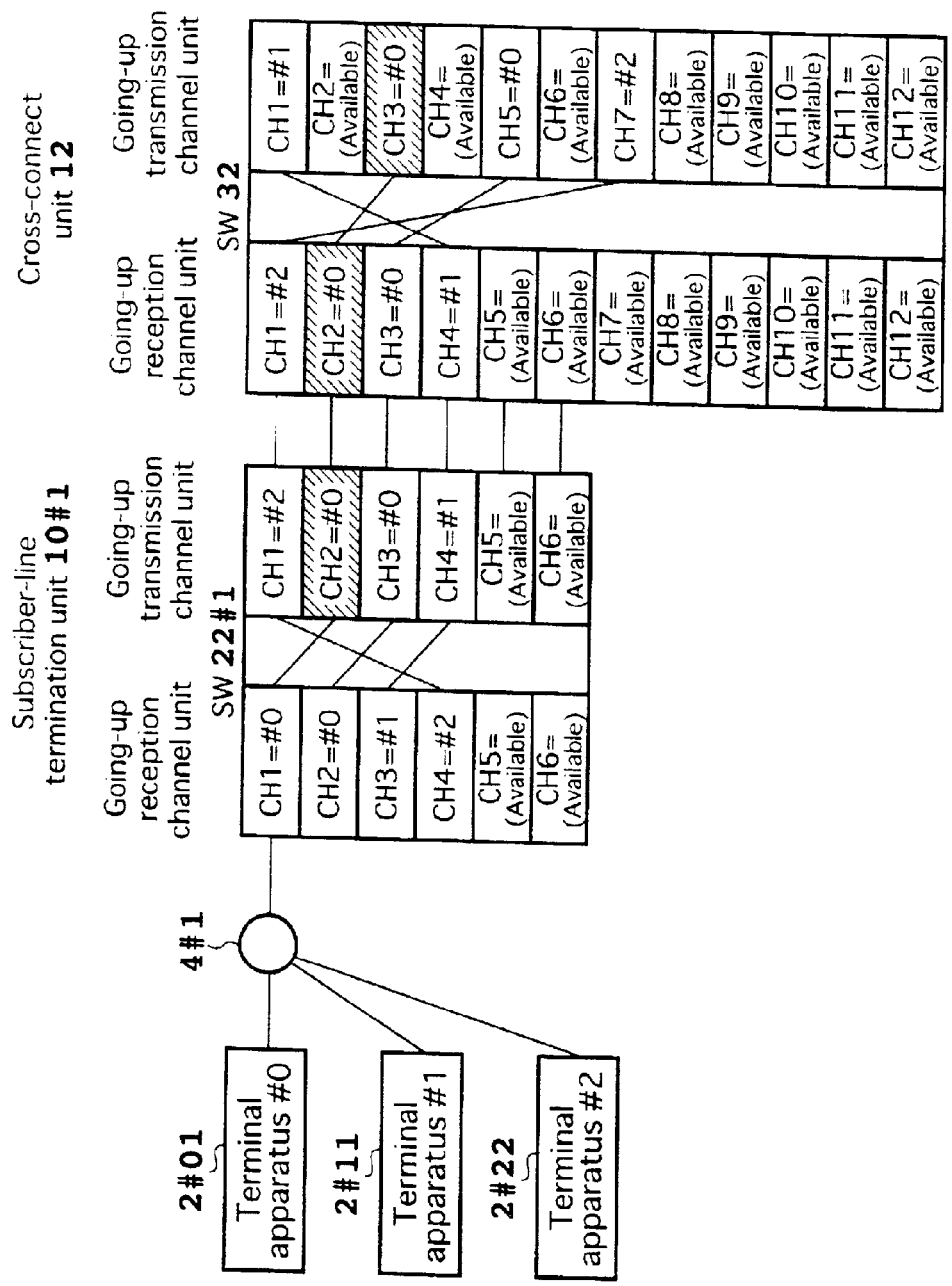
FIG. 6 is a diagram showing an abnormal state of a going-up channel.

(1-a) FIG. 6 is a diagram showing an abnormal state of a going-up channel. To be more specific, the diagram shows an abnormal state of the switch 22#1 connecting the going-up reception channel unit 20#11 to the going-up transmission channel unit 24#12. As shown in FIG. 6, transmissions from the terminal apparatus 2#10 are abnormal due to the abnormal state of the switch 22#1. To be more specific, the going-up channel involving the going-up transmission channel unit 24#12, the going-up reception channel unit 30#12 and the going-up transmission channel unit 34#13, which are each indicated by a hatched block, is abnormal. The communication-state-monitoring unit 120 employed in the control apparatus 100 detects an abnormality of a going-up channel involving the going-up transmission channel unit 34#13 and transmits the transmission channel number 3 of the going-up transmission channel unit 34#13 to the control central unit 110. The control central unit 110 identifies the going-up reception channel unit 30#12 connected to the going-up transmission channel unit 34#13 by referring to the cross-connect-unit table 118. The control central unit 110 then outputs the channel number of the going-up reception channel unit 30#12 to the subscriber-line-termination-unit switching update unit 112 and, at the same time, outputs the channel number of the going-up transmission channel unit 34#13 to the cross-connect-unit switching update unit 116.

The going-up reception channel unit 30#12 is connected to the going-up transmission channel unit 24#12. The subscriber-line-termination-unit switching update unit 112 identifies the going-up reception channel unit 20#10 of the terminal apparatus 2#10 having an apparatus number of 0 as a going-up transmission channel unit connected to the going-up transmission channel unit 24#12 by referring to the subscriber-line-termination-unit table 114. The subscriber-line-termination-unit switching update unit 112 also identifies the going-up transmission channel unit 24#15 as an available going-up transmission channel unit with a lowest channel number. In addition, the subscriber-line-termination-unit switching update unit 112 requests the switch 22#1 employed in the subscriber-line termination unit 10#1 to connect the going-up reception channel unit 20#10 to the going-up transmission channel unit 24#15, which is identified as an available going-up transmission channel unit with a lowest channel number. Furthermore, the subscriber-line-termination-unit switching update unit 112 catalogs the connection of the going-up reception channel unit 20#10 to the going-up transmission channel unit 24#15 in the subscriber-line-termination-unit table 114. The subscriber-line-termination-unit switching update unit 112 also catalogs the going-up transmission channel unit 24#12 in the subscriber-line-termination-unit table 114 as an available going-up transmission channel unit. While the subscriber-line-termination-unit switching update unit 112 is carrying out this switching operation, the cross-connect-unit switching update unit 116 identifies the going-up reception channel unit 30#15 as an available going-up reception channel unit with a lowest channel number. The cross-connect-unit switching update unit 116 then requests the switch 32 employed in the cross-connect unit 12 to connect the going-up transmission channel unit 34#13 to the going-up reception channel unit 30#15, which is identified as an available going-up reception channel unit with a lowest channel number. Subsequently, the cross-connect-unit switching update unit 116 catalogs the connection of the going-up transmission channel unit 34#13 to the going-up reception channel unit 30#15 in the cross-connect-unit table 118. The cross-connect-unit switching update unit 116 also catalogs the going-up reception channel unit 30#12 in the cross-connect-unit table 118 as an available going-up reception channel unit.

Figure 7:
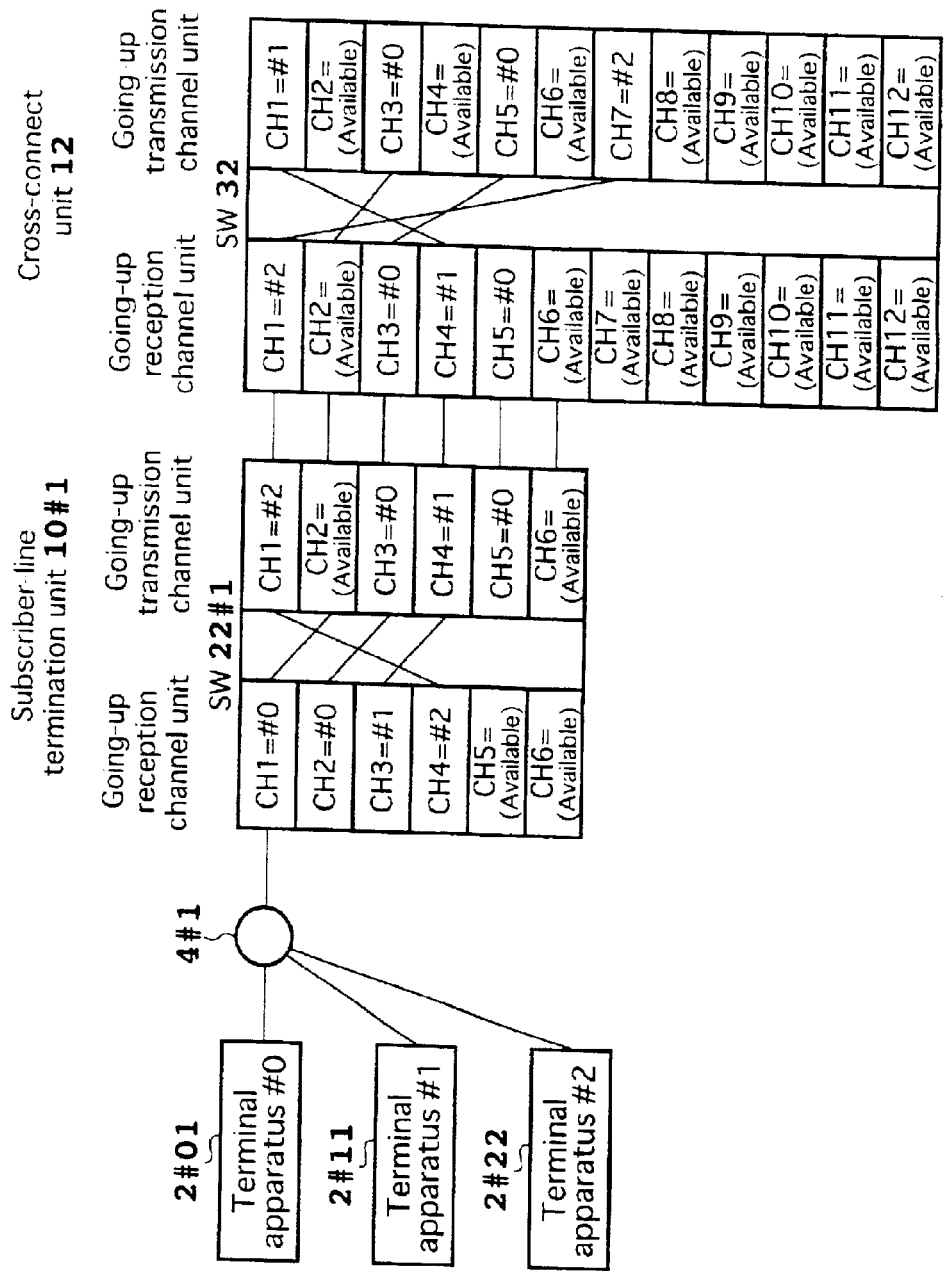
FIG. 7 is a diagram showing a recovered state of a going-up channel.

FIG. 7 is a diagram showing a recovered state of the going-up channel. As shown in FIG. 7, in the subscriber-line termination unit 10#1, the going-up reception channel unit 20#11 is connected to the going-up transmission channel unit 24#15. In the cross-connect unit 12, on the other hand, the going-up transmission channel unit 24#15 is connected to the going-up transmission channel unit 34#13 through the going-up reception channel unit 30#15. Thus, the abnormal route through the going-up transmission channel unit 24#12, which is abnormal, is avoided and the going-up channel is recovered from the abnormality. As a result, the problem (b) of the conventional technology can be solved.

Figure 8:
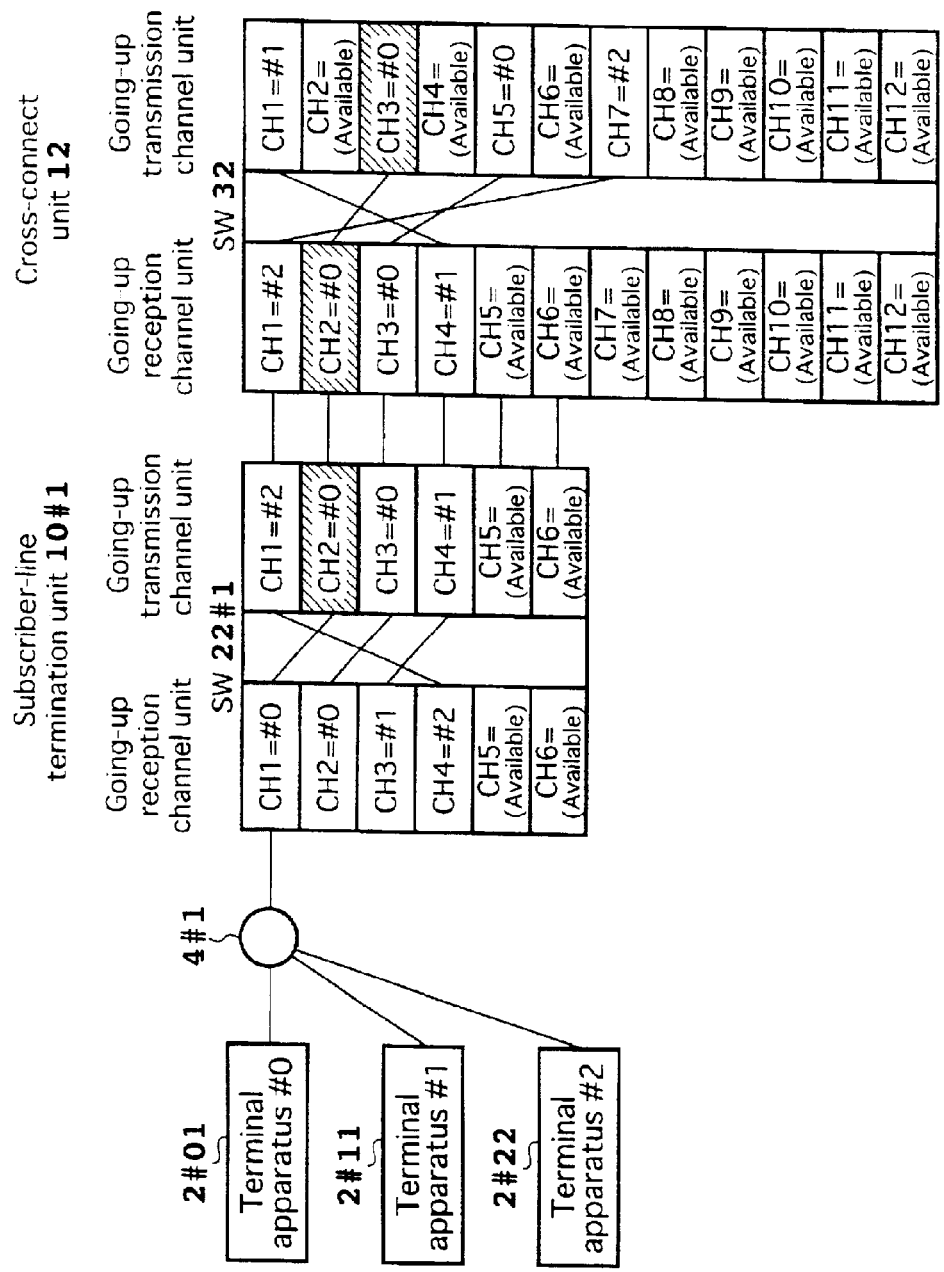
FIG. 8 is a diagram showing an abnormal state of a going-up channel.

(1-b) FIG. 8 is a diagram showing an abnormal state of a going-up channel. To be more specific, the diagram shows an abnormal state of the going-up transmission channel unit 24#12 employed in the subscriber-line termination unit 10#1. As shown in FIG. 8, transmissions from the terminal apparatus 2#10 are abnormal due to the abnormal state of the going-up transmission channel unit 24#12. To be more specific, the going-up channel involving the going-up transmission channel unit 24#12, the going-up reception channel unit 30#12 and the going-up transmission channel unit 34#13, which are each indicated by a hatched block in the cross-connect unit 12, is abnormal. The communication-state-monitoring unit 120 employed in the control apparatus 100 detects an abnormality of a going-up channel involving the going-up transmission channel unit 34#13 and transmits the transmission channel number 3 of the going-up transmission channel unit 34#13 to the control central unit 110. Then, the same operations as section (1-a) are carried out. As a result, a recovered state of the going-up channel is obtained as shown in FIG. 7. As shown in the figure, in the subscriber-line termination unit 10#1, the going-up reception channel unit 20#11 is connected to the going-up transmission channel unit 24#15. In the cross-connect unit 12, on the other hand, the going-up transmission channel unit 24#15 is connected to the going-up transmission channel unit 34#13 through the going-up reception channel unit 30#15. Thus, the abnormal route is avoided and the going-up channel is recovered from the abnormality. As a result, the problem (c) of the conventional technology can be solved.

Figure 9:
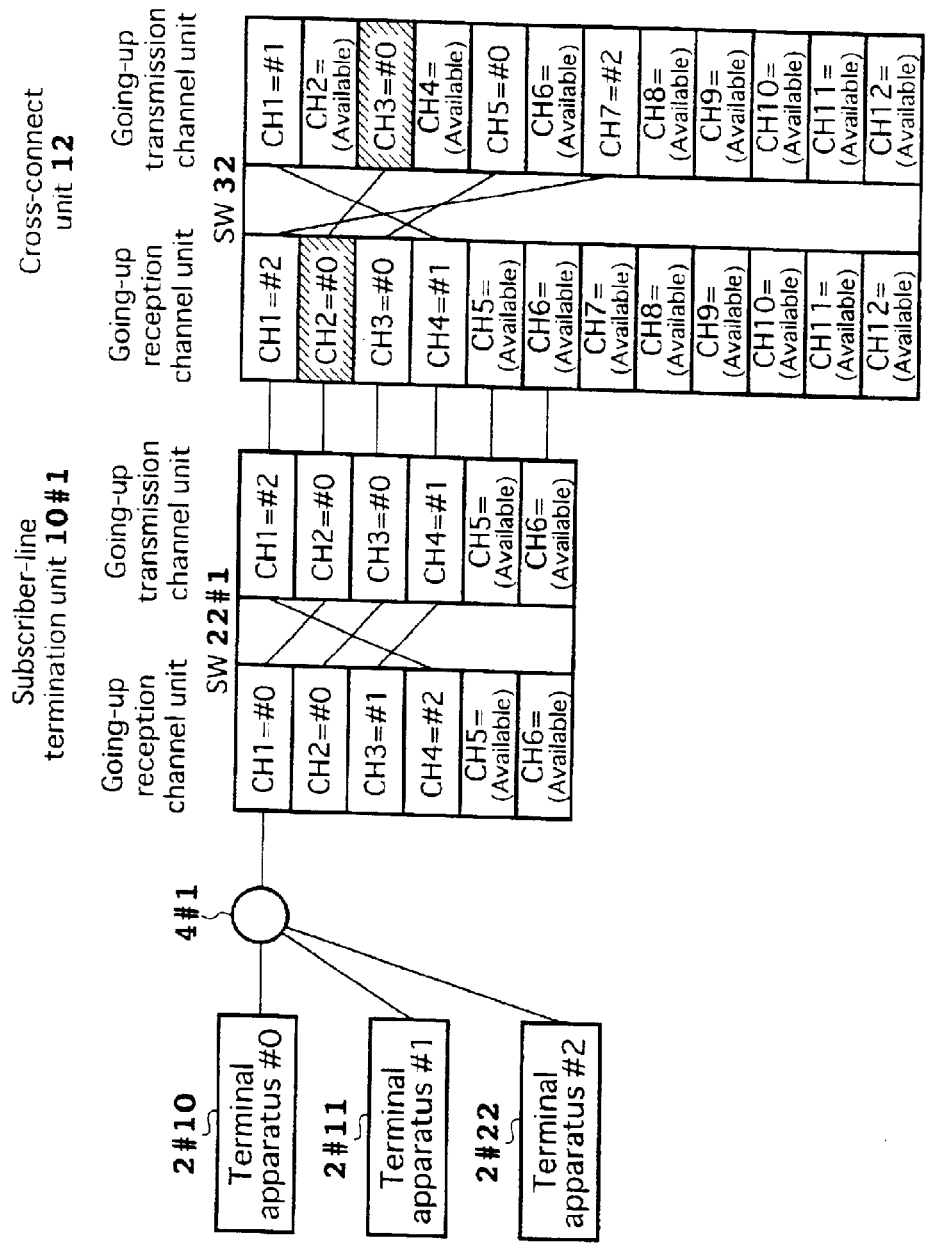
FIG. 9 is a diagram showing an abnormal state of a going-up channel.

(1-c) FIG. 9 is a diagram showing an abnormal state of a going-up channel. To be more specific, the diagram shows an abnormal state of the going-up reception channel unit 30#12 employed in the cross-connect unit 12. As shown in FIG. 9, transmissions from the terminal apparatus 2#10 are abnormal due to the abnormal state of the going-up transmission channel unit 24#12. To be more specific, the going-up channel involving the going-up reception channel unit 30#12 and the going-up transmission channel unit 34#13, which are each indicated by a hatched block in the cross-connect unit 12, is abnormal. The communication-state-monitoring unit 120 employed in the control apparatus 100 detects an abnormality of a going-up channel involving the going-up transmission channel unit 34#13 and transmits the transmission channel number 3 of the going-up transmission channel unit 34#13 to the control central unit 110. Then, the same operations as section (1-a) are carried out. As a result, a recovered state of the going-up channel is obtained as shown in FIG. 7. As shown in the figure, in the subscriber-line termination unit 10#1, the going-up reception channel unit 20#11 is connected to the going-up transmission channel unit 24#15. In the cross-connect unit 12, on the other hand, the going-up transmission channel unit 24#15 is connected to the going-up transmission channel unit 34#13 through the going-up reception channel unit 30#15. Thus, the abnormal route through the going-up reception channel unit 30#12, which is abnormal, is avoided and the going-up channel is recovered from the abnormality. As a result, the problem (d) of the conventional technology can be solved.

Figure 10:
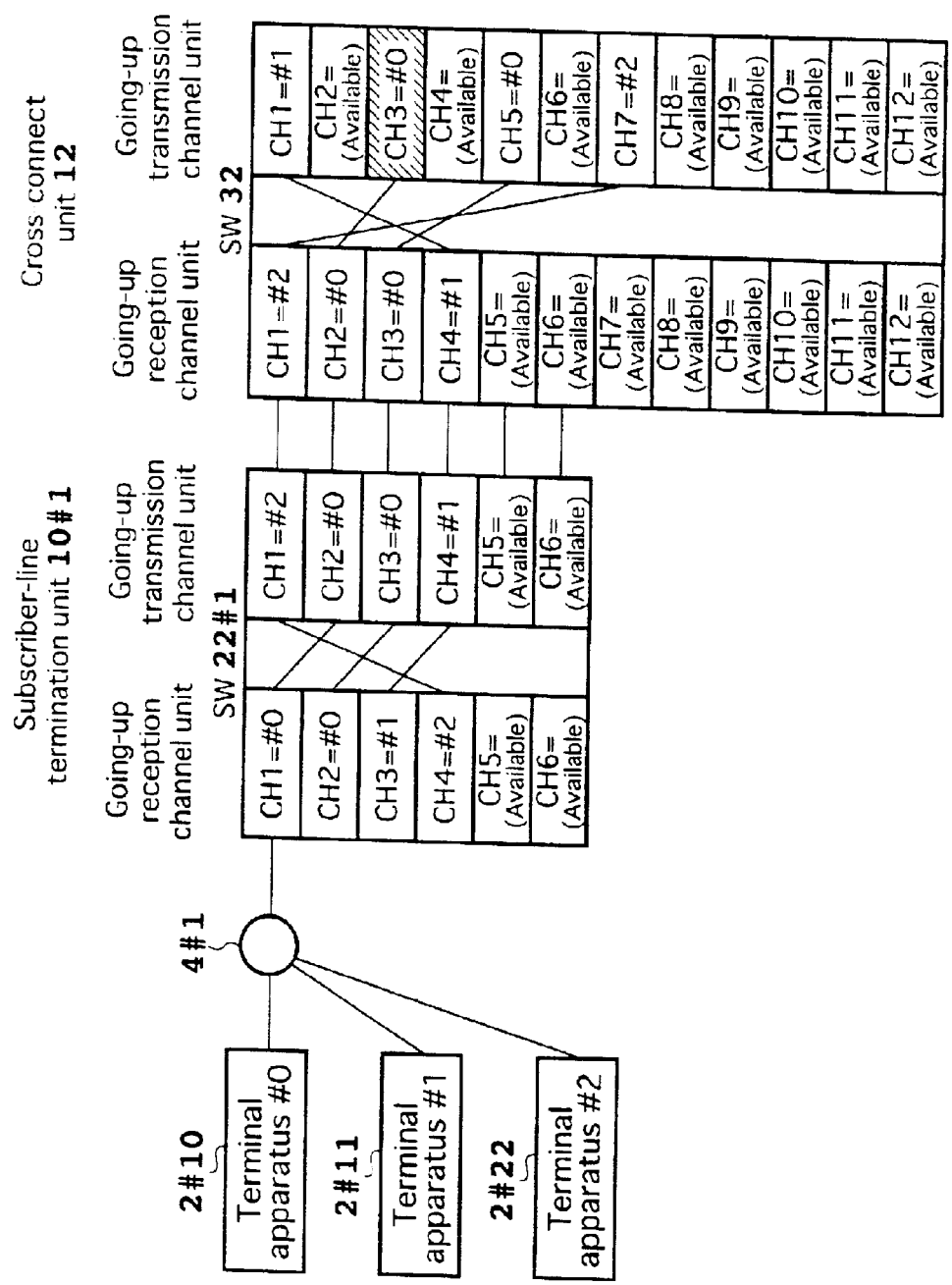
FIG. 10 is a diagram showing an abnormal state of a going-up channel.

(1-d) FIG. 10 is a diagram showing an abnormal state of a going-up channel. To be more specific, the diagram shows an abnormal state of the switch 32 connecting the going-up reception channel unit 30#12 to the going-up transmission channel unit 34#13. As shown in FIG. 10, transmissions from the terminal apparatus 2#10 are abnormal due to the abnormal state of the switch 32. To be more specific, the going-up channel involving the going-up transmission channel unit 34#13 indicated by a hatched block in the cross-connect unit 12 is abnormal. The communication-state-monitoring unit 120 employed in the control apparatus 100 detects an abnormality of a going-up channel involving the going-up transmission channel unit 34#13 and transmits the transmission channel number 3 of the going-up transmission channel unit 34#13 to the control central unit 110. Then, the same operations as section (1-a) are carried out. As a result, a recovered state of the going-up channel is obtained as shown in FIG. 7. As shown in the figure, in the subscriber-line termination unit 10#1, the going-up reception channel unit 20#11 is connected to the going-up transmission channel unit 24#15. In the cross-connect unit 12, on the other hand, the going-up transmission channel unit 24#15 is connected to the going-up transmission channel unit 34#13 through the going-up reception channel unit 30#15. Thus, the abnormal route through the going-up transmission channel unit 34#13, which is abnormal, is avoided and the going-up channel is recovered from the abnormality. As a result, the problem (e) of the conventional technology can be solved.

2: Processing of a recovery from an abnormality of a going-down channel

Figure 11:
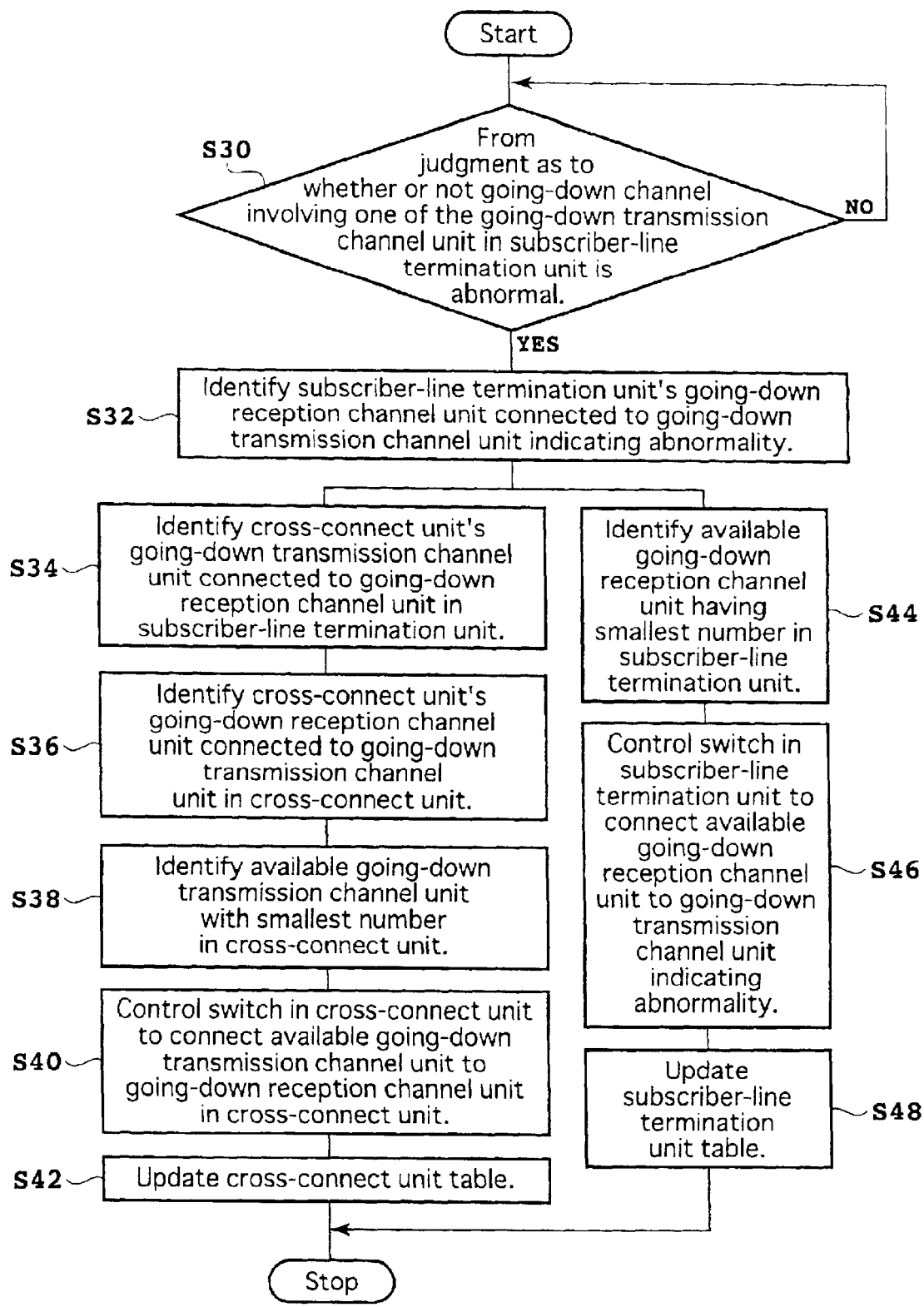
FIG. 11 is a flowchart representing a recovery method adopted in the event of an abnormality occurring in a going-down channel.

FIG. 11 is a flowchart representing a recovery method adopted in the event of an abnormality occurring in a going-down channel. As shown in FIG. 11, the flowchart begins with a step S30 to form a judgment as to whether or not the control central unit 110 has been informed by the communication-state-monitoring unit 120 that a going-down channel involving one of the going-down transmission channel units 40#ij in the subscriber-line termination unit 10#ij, where i=1, 2 and so on whereas j=1, 2 and so on, is abnormal. If the control central unit 110 has been informed of an abnormality by the communication-state-monitoring unit 120, the flow of the processing goes on to a step S32. If the control central unit 110 has not been informed of an abnormality by the communication-state-monitoring unit 120, on the other hand, the flow of the processing goes back to the step S30 to form the same judgment in a state of waiting for the communication-state-monitoring unit 120 to inform the control central unit 110 of an abnormality. Assume that a going-down channel involving the going-down transmission channel unit 40#ab in the subscriber-line termination unit 10#ij is abnormal. In this case, at the next step S32, the control central unit 110 identifies a going-down reception channel unit 44#ac connected to the going-down transmission channel unit 40#ab by referring to the subscriber-line-termination-unit table 114. Then, the control central unit 110 informs the cross-connect-unit switching update unit 116 that a channel involving the going-down reception channel unit 44#ac is abnormal. In addition, the control central unit 110 also informs the subscriber-line-termination-unit switching update unit 112 that a channel involving the going-down transmission channel unit 40#ab is abnormal.

At a next step S34, the cross-connect-unit switching update unit 116 identifies a going-down transmission channel unit 50#ac connected to the going-down reception channel unit 44#ac. At the next step S36, the cross-connect-unit switching update unit 116 identifies a going-down reception channel unit 54#de connected to the going-down transmission channel unit 50#ac by referring to the cross-connect-unit table 118. At the next step S38, the cross-connect-unit switching update unit 116 identifies an available going-down transmission channel unit 50#af with a smallest number among the going-down transmission channel units 50#ak where k=1, 2 and so on by referring to the cross-connect-unit table 118. At the next step S40, the cross-connect-unit switching update unit 116 controls the switch 52 to connect the available going-down transmission channel unit 50#af to the going-down reception channel unit 54#de. At the next step S42, the cross-connect-unit switching update unit 116 catalogs the connection of the going-down transmission channel unit 50#af and the going-down reception channel unit 54#de in the cross-connect-unit table 118. The cross-connect-unit switching update unit 116 also catalogs the going-down transmission channel unit 50#ac in the cross-connect-unit table 118 as an available going-down transmission channel unit.

At the next step S44, the subscriber-line-termination-unit switching update unit 112 identifies an available going-down reception channel unit 44#af having a smallest number by referring to the subscriber-line-termination-unit table 114. At the next step S46, much like the execution of the step S40, the subscriber-line-termination-unit switching update unit 112 controls the switch 42#a to connect the available going-down reception channel unit 44#af to the going-down transmission channel unit 40#ab. At the next step S48, the subscriber-line-termination-unit switching update unit 112 catalogs the connection of the available going-down reception channel unit 44#af and the going-down transmission channel unit 40#ab in the subscriber-line-termination-unit table 114. The subscriber-line-termination-unit switching update unit 112 also catalogs the going-down reception channel unit 44#ac in the subscriber-line-termination-unit table 114 as an available going-down reception channel unit.

Figure 12:
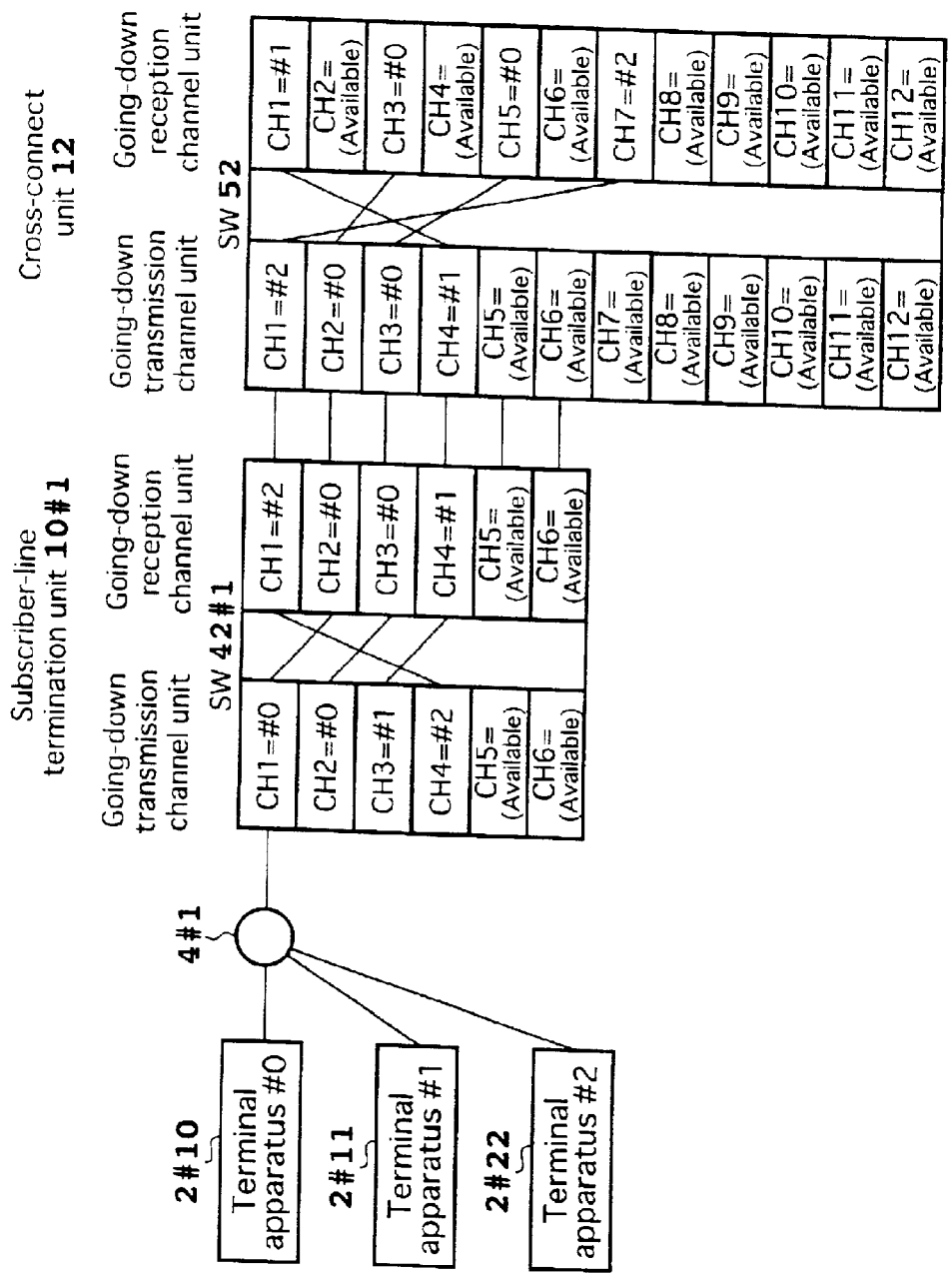
FIG. 12 is a diagram showing a normal state of a going-down channel.

A recovery from an abnormality is exemplified in concrete terms as follows. FIG. 12 is a diagram showing a normal state of a going-down channel. To be more specific, the diagram shows typical connections between the subscriber-line termination unit 10#1 and the cross-connect unit 12. In FIG. 12, notation CHX=#Y indicates that a channel with a channel number X is assigned to a terminal apparatus 2#1Y having an apparatus number Y. Solid lines in the switch 42#1 and the switch 52 each indicate that a going-down reception channel unit is connected to a going-down transmission channel unit.

Figure 13:
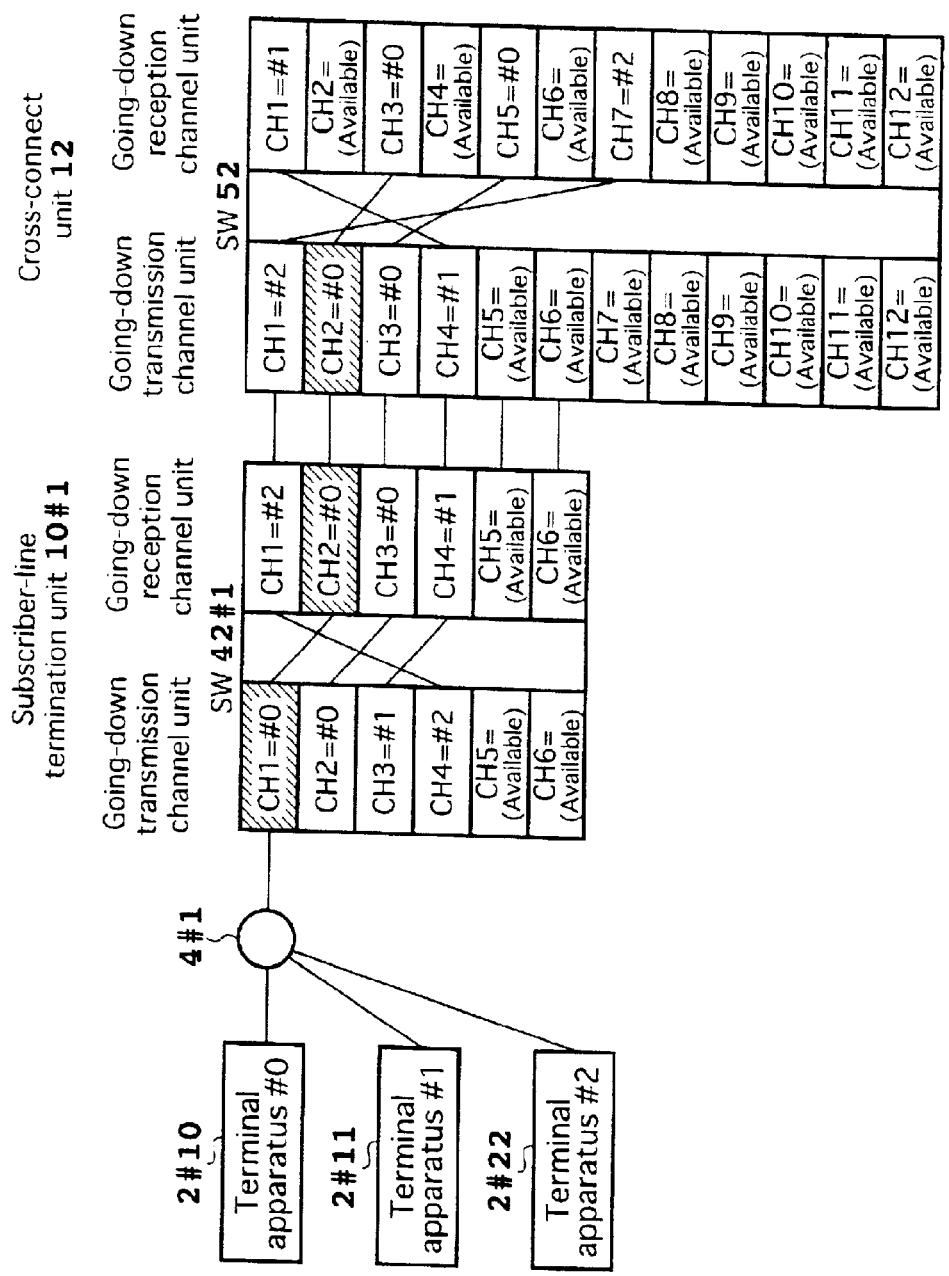
FIG. 13 is a diagram showing an abnormal state of a going-down channel.

(2-a) FIG. 13 is a diagram showing an abnormal state of a going-down channel. To be more specific, the diagram shows an abnormal state of the switch 52 connecting the going-down reception channel unit 54#13 to the going-down transmission channel unit 50#12 in the cross-connect unit 12. As shown in FIG. 13, receptions by the terminal apparatus 2#10 are abnormal due to the abnormal state of the switch 52. To be more specific, the going-down channel involving the going-down transmission channel unit 50#12, the going-down reception channel unit 44#12 and the going-down transmission channel unit 40#11, which are each indicated by a hatched block, is abnormal. The communication-state-monitoring unit 120 employed in the control apparatus 100 detects an abnormality of a going-down channel involving the going-down transmission channel unit 40#11 and transmits the transmission channel number 1 of the going-down transmission channel unit 40#11 to the control central unit 110. The control central unit 110 identifies the going-down reception channel unit 44#12 connected to the going-down transmission channel unit 40#11 by referring to the subscriber-line-termination-unit table 114. The control central unit 110 then outputs the channel number of the going-down reception channel unit 44#12 to the cross-connect-unit switching update unit 116 and, at the same time, outputs the channel number of the going-down transmission channel unit 40#11 to the subscriber-line-termination-unit switching update unit 112.

The going-down reception channel unit 44#12 is connected to the going-down transmission channel unit 50#12. The cross-connect-unit switching update unit 116 identifies the going-down transmission channel unit 50#15 as an available going-down transmission channel unit with a lowest channel number. In addition, the cross-connect-unit switching update unit 116 requests the switch 52 employed in the cross-connect unit 12 to connect the going-down reception channel unit 54#13 to the going-down transmission channel unit 50#15, which is identified as an available going-down transmission channel unit with a lowest channel number. Furthermore, the cross-connect-unit switching update unit 116 catalogs the connection of the going-down reception channel unit 54#13 to the going-down transmission channel unit 50#15 in the cross-connect-unit table 118. The cross-connect-unit switching update unit 116 also catalogs the going-down transmission channel unit 50#12 in the cross-connect-unit table 118 as an available going-down transmission channel unit. While the cross-connect-unit switching update unit 116 is carrying out this switching operation, the subscriber-line-termination-unit switching update unit 112 identifies the going-down reception channel unit 44#15 as an available going-down reception channel unit with a lowest channel number. The subscriber-line-termination-unit switching update unit 112 then requests the switch 42#1 employed in the subscriber-line termination unit 10#1 to connect the going-down transmission channel unit 40#11 to the going-down reception channel unit 44#15, which is identified as an available going-down reception channel unit with a lowest channel number. Subsequently, the subscriber-line-termination-unit switching update unit 112 catalogs the connection of the going-down transmission channel unit 40#11 to the going-down reception channel unit 44#15 in the subscriber-line-termination-unit table 114. The subscriber-line-termination-unit switching update unit 112 also catalogs the going-down reception channel unit 44#12 in the subscriber-line-termination-unit table 114 as an available going-down reception channel unit.

Figure 14:
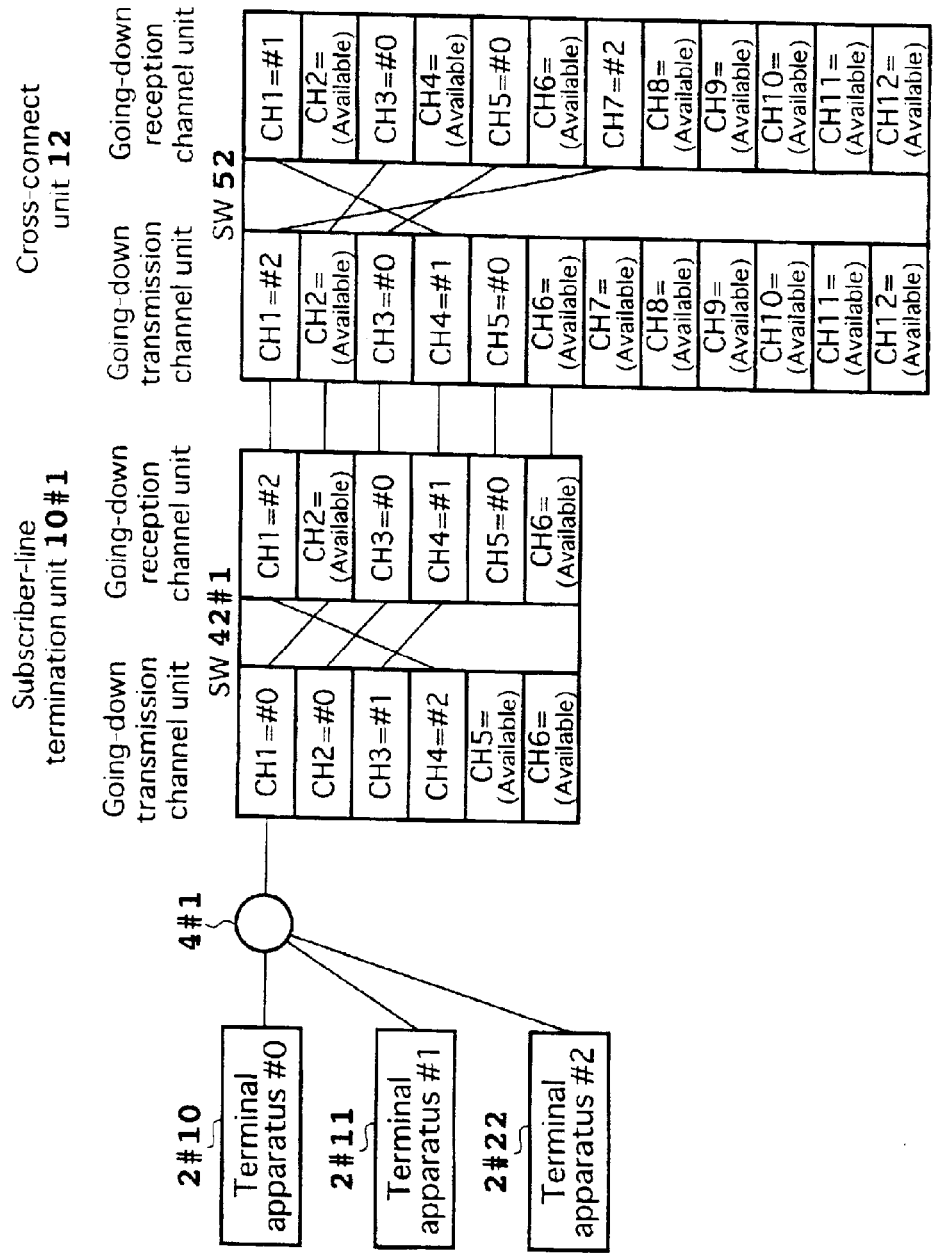
FIG. 14 is a diagram showing a recovered state of a going-down channel.

FIG. 14 is a diagram showing a recovered state of the going-down channel. As shown in FIG. 14, in the subscriber-line termination unit 10#1, the going-down transmission channel unit 40#11 is connected to the going-down reception channel unit 44#15. In the cross-connect unit 12, on the other hand, the going-down reception channel unit 44#15 is connected to the going-down reception channel unit 54#13 through the going-down transmission channel unit 50#15. Thus, the abnormal route is avoided and the going-down channel is recovered from the abnormality.

Figure 15:
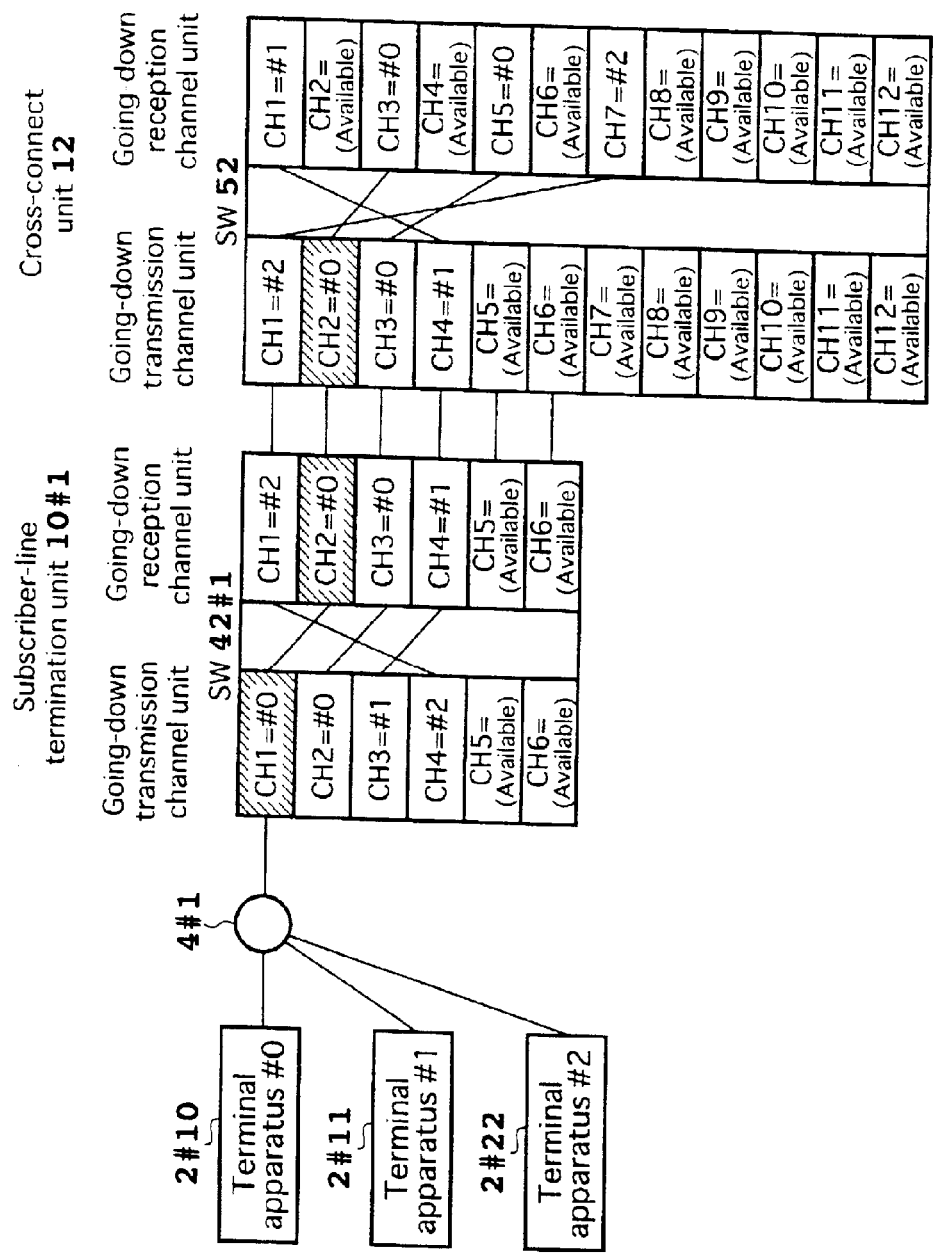
FIG. 15 is a diagram showing an abnormal state of a going-down channel.
Figure 16:
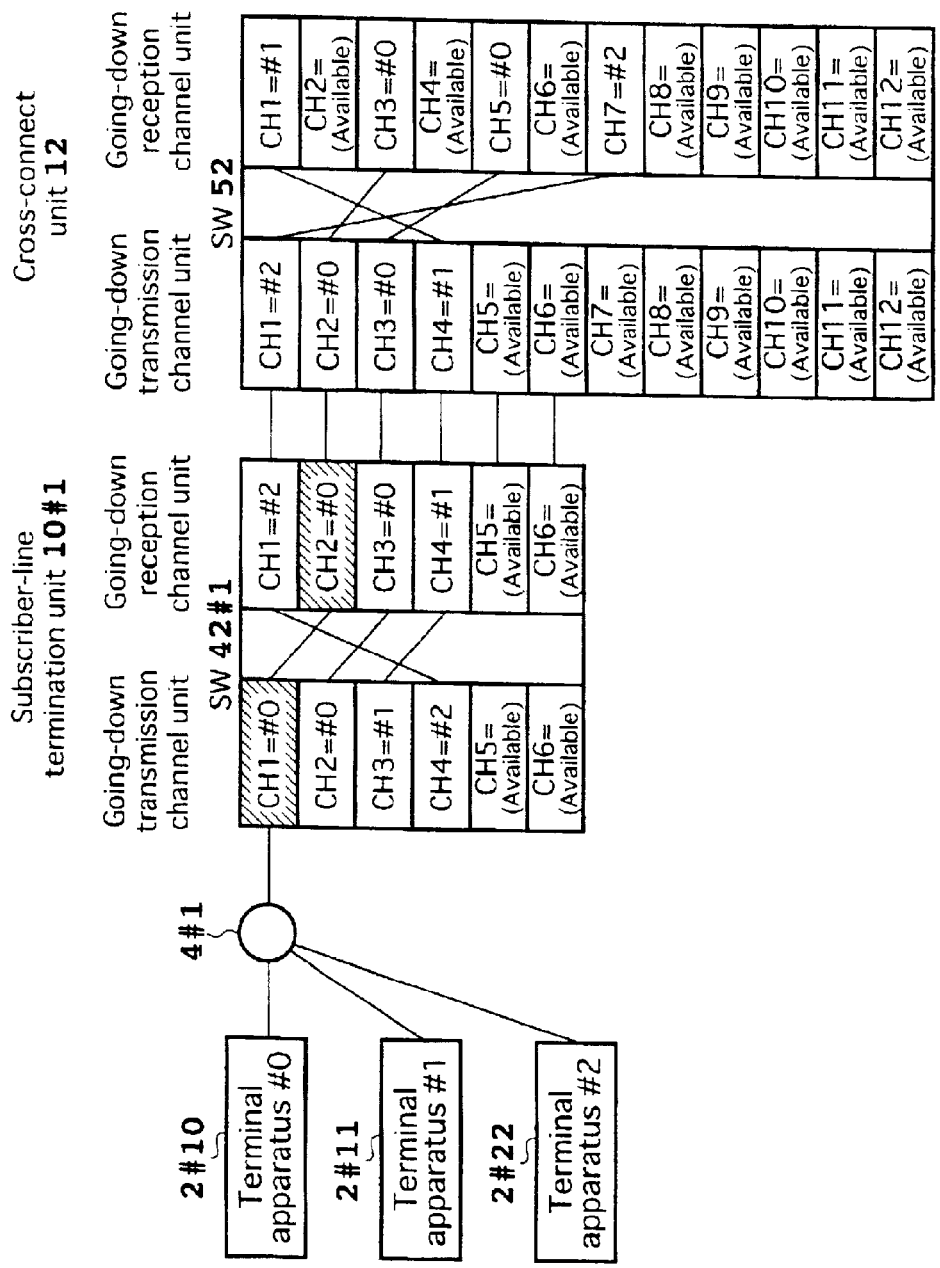
FIG. 16 is a diagram showing an abnormal state of a going-down channel.
Figure 17:
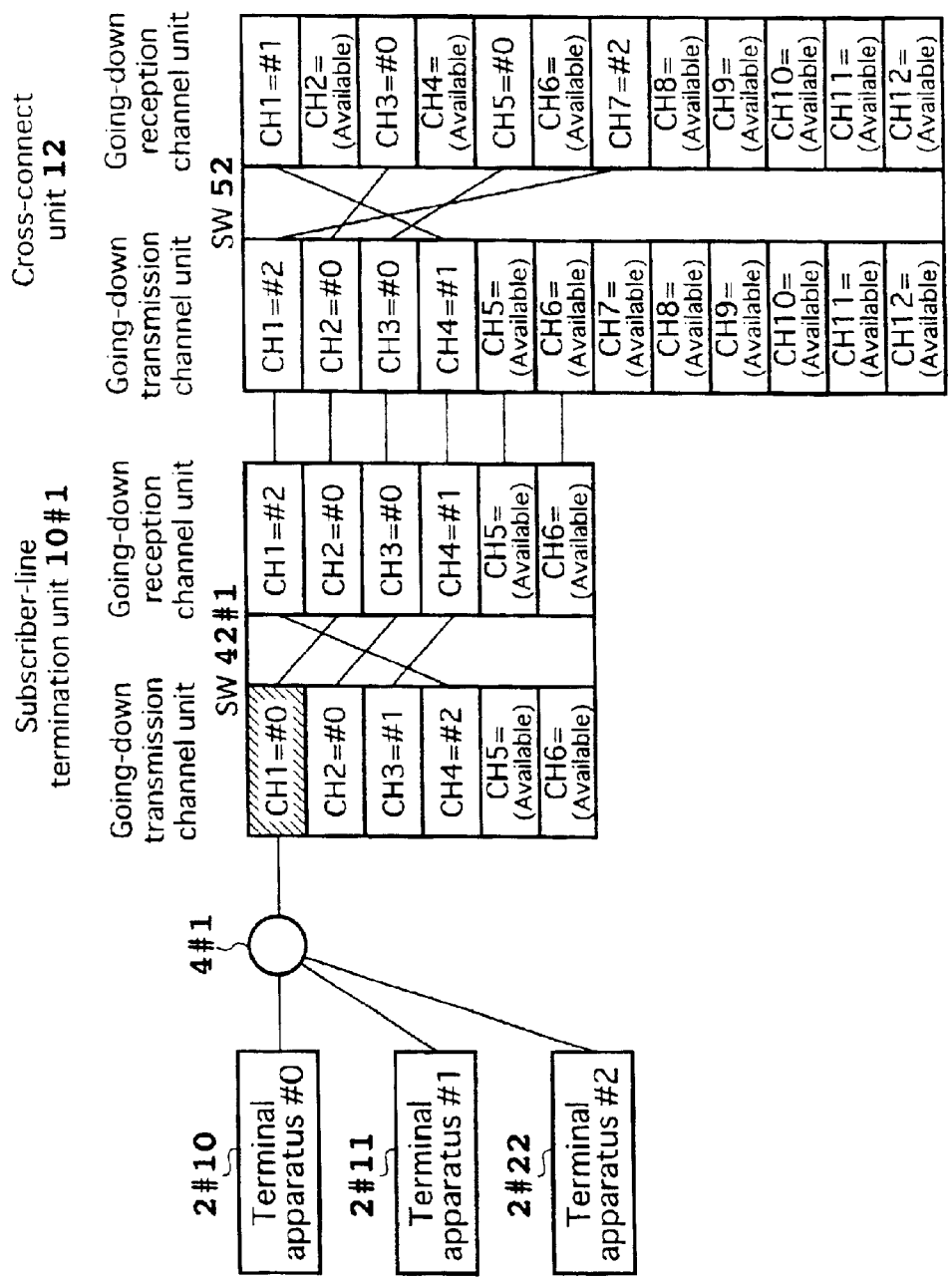
FIG. 17 is a diagram showing an abnormal state of a going-down channel.

(2-b) FIG. 15 is a diagram showing an abnormal state of a going-down channel. To be more specific, the diagram shows an abnormal state of the going-down transmission channel unit 50#12 employed in the cross-connect unit 12. FIG. 16 is also a diagram showing an abnormal state of a going-down channel. To be more specific, the diagram shows an abnormal state of the going-down reception channel unit 44#12 employed in the subscriber-line termination unit 10#1. FIG. 17 is also a diagram showing an abnormal state of a going-down channel. To be more specific, the diagram shows an abnormal state of the switch 42#1 connecting the going-down reception channel unit 44#12 to the going-down transmission channel unit 40#11 in the subscriber-line termination unit 10#1. Also in these cases, the same operations as section (2-a) are carried out to recover from the abnormality.

In accordance with the present invention described above, an abnormal portion of a channel can be automatically identified and the use of the abnormal portion can be avoided also automatically. It is thus possible to recover from an abnormal state of communication without resorting to cumbersome manual operations. As a result, the maintenance and operation costs can be reduced and the apparatus reliability can be improved. In particular, the effect of the improved reliability is big for a case in which it is impossible to design the subscriber-line termination unit and the cross-connect unit into a redundant configuration.

It should be noted that the present invention is not limited to the details of the preferred embodiments described above. The scope of the present invention is defined by the following appended claims, and all changes and modifications falling within the scope of the claims are therefore to be embraced by the invention.

What is claimed is:

1. A control apparatus for controlling a recovery of a terminal-station apparatus comprising:

a subscriber-line termination unit, which has a plurality of first going-up reception channel units accommodating a plurality of terminal apparatuses and a plurality of first going-up transmission channel units and is used for connecting each of said first going-up reception channel units to a corresponding one of said first going-up transmission channel units;

a cross-connect unit, which has a plurality of second going-up reception channel units and a plurality of second going-up transmission channel units and is used for connecting each of said second going-up reception channel units to a corresponding one of said second going-up transmission channel units; and an exchange connection unit being connected each of said second going-up transmission channel units and an exchange, wherein said control apparatus comprising:

a communication-state-monitoring unit for detecting an abnormality appearing at each of said second going-up transmission channel units;

a first channel-identifying unit for identifying one of said second going-up reception channel units that is connected to said second going-up transmission channel unit determined by said communication-state-monitoring unit as a channel unit indicating an abnormality;

a second channel-identifying unit for identifying one of said first going-up reception channel units that is connected to said second going-up reception channel unit identified by said first channel-identifying unit through one of said first going-up transmission channel units;

a first control unit, which is used for controlling said cross-connect unit so as to connect a particular one of said second going-up transmission channel units to an available one of said second going-up reception channel units in case said particular one of said second going-up transmission channel units is determined by said communication-state-monitoring unit as a channel unit indicating an abnormality; and a second control unit for controlling said subscriber-line termination unit so as to connect said first going-up reception channel unit identified by said second channel-identifying unit to an available one of said first going-up transmission channel units.

2. A control apparatus according to claim 1, said control apparatus further comprising:

a subscriber-line termination unit table for storing a connection of said first going-up reception channel unit and said first going-up transmission channel unit and storing information on available first going-up transmission channel units; and a cross-connect unit table for storing a connection of said second going-up reception channel unit and corresponding said second going-up transmission channel unit and storing information on available second going-up reception channel units.

3. A control apparatus according to claim 2 wherein said first control unit controls said cross-connect unit so as to connect said second going-up transmission channel unit to an available one of said second going-up reception channel units, which has a smallest channel number, on the basis of said cross-connect unit table.

4. A control apparatus according to claim 2 wherein said second control unit controls said subscriber-line termination unit so as to connect said first going-up reception channel unit to an available one of said first going-up transmission channel units, which has a smallest channel number among said first going-up transmission channel units connectable to said subscriber-line termination unit having an abnormal channel, on the basis of said subscriber-line termination unit table.

5. A control apparatus for controlling a terminal-station apparatus comprising:

a subscriber-line termination unit, which has a plurality of first going-down transmission channel units accommodating a plurality of terminal apparatuses and a plurality of first going-down reception channel units and is used for connecting each of said first going-down reception channel units to a corresponding one of said first going-down transmission channel units;

a cross-connect unit, which has a plurality of second going-down reception channel units and a plurality of second going-down transmission channel units and is used for connecting each of said second going-down reception channel units to a corresponding one of said second going-down transmission channel units; and an exchange connection unit being connected each of said second going-down reception channel units and an exchange, wherein said control apparatus comprising:

a communication-state-monitoring unit for detecting an abnormality appearing at each of said first going-down transmission channel units;

a first channel-identifying unit for identifying one of said first going-down reception channel units that is connected to said first going-down transmission channel unit determined by said communication-state-monitoring unit as a channel unit indicating an abnormality;

a second channel-identifying unit for identifying one of said second going-down reception channel units that is connected to said first going-down reception channel unit identified by said first channel-identifying unit through one of said second going-down transmission channel units;

a first control unit, which is used for controlling said subscriber-line termination unit so as to connect a particular one of said first going-down transmission channel units to an available one of said first going-down reception channel units in case said particular one of said first going-down transmission channel units is determined by said communication-state-monitoring unit as a channel unit indicating an abnormality; and a second control unit for controlling said cross-connect unit so as to connect said second going-down reception channel unit identified by said second channel-identifying unit to an available one of said second going-down transmission channel units.

6. A control apparatus according to claim 5, said control apparatus further comprising:

a subscriber-line termination unit table for storing a connection of said first going-down reception channel unit and said first going-down transmission channel unit and storing information on available first going-down reception channel units; and a cross-connect unit table for storing a connection of said second going-down reception channel unit and said second going-down transmission channel unit and storing information on available second going-down transmission channel units.

7. A control apparatus according to claim 6 wherein said first control unit controls said subscriber-line termination unit so as to connect said first going-down transmission channel unit to an available one of said second going-down reception channel units, which has a smallest channel number, on the basis of said subscriber-line termination unit table.

8. A control apparatus according to claim 6 wherein said second control unit controls said cross-connect unit so as to connect said second going-down reception channel unit to an available one of said second going-down transmission channel units, which has a smallest channel number among said second going-down transmission channel units connectable to said subscriber-line termination unit having an abnormal channel, on the basis of said cross-connect unit table.

* * * * *